(12) United States Patent
Shibata et al.

(10) Patent No.: US 12,477,855 B2
(45) Date of Patent: Nov. 18, 2025

(54) PHOTOELECTRIC CONVERSION DEVICE HAVING SIGNAL READOUT CIRCUITS AND PHOTOELECTRIC CONVERSION SYSTEM

(71) Applicant: CANON KABUSHIKI KAISHA, Tokyo (JP)

(72) Inventors: Masanori Shibata, Tokyo (JP); Yu Arishima, Kanagawa (JP); Koichiro Iwata, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 205 days.

(21) Appl. No.: 18/341,601

(22) Filed: Jun. 26, 2023

(65) Prior Publication Data

US 2024/0006453 A1   Jan. 4, 2024

(30) Foreign Application Priority Data

Jun. 29, 2022  (JP) ................. 2022-104635

(51) Int. Cl.
*H04N 25/46*   (2023.01)
*H04N 25/77*   (2023.01)
*H04N 25/78*   (2023.01)
*H04N 25/79*   (2023.01)
*H10F 39/00*   (2025.01)
*H10F 39/18*   (2025.01)

(52) U.S. Cl.
CPC .......... *H10F 39/811* (2025.01); *H04N 25/46* (2023.01); *H04N 25/77* (2023.01); *H04N 25/78* (2023.01); *H10F 39/182* (2025.01); *H10F 39/813* (2025.01); *H04N 25/79* (2023.01)

(58) Field of Classification Search
CPC ........ H04N 25/46; H04N 25/77; H04N 25/78; H04N 25/79; H10F 39/12; H10F 39/182; H10F 39/8053; H10F 39/811; H10F 39/813

See application file for complete search history.

(56) References Cited

U.S. PATENT DOCUMENTS

| | | | |
|---|---|---|---|
| 2014/0139713 A1* | 5/2014 | Gomi | H04N 25/65 348/308 |
| 2015/0156433 A1* | 6/2015 | Nomura | H04N 25/443 348/308 |
| 2016/0005788 A1 | 1/2016 | Ogura | |
| 2019/0238764 A1* | 8/2019 | Niwa | H04N 25/46 |
| 2021/0400224 A1* | 12/2021 | Gocho | H10F 39/802 |

FOREIGN PATENT DOCUMENTS

| | | |
|---|---|---|
| JP | 2016019079 A | 2/2016 |
| WO | 2020105713 A1 | 5/2020 |

* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

A photoelectric conversion device includes a first substrate and a second substrate. A plurality of photoelectric conversion circuits is disposed on the first substrate. A plurality of floating diffusion circuits, a first switch, and a plurality of amplification transistors are disposed on the second substrate. The plurality of floating diffusion circuits is connected to the plurality of photoelectric conversion circuits. The first switch is configured to connect a first floating diffusion circuit and a second floating diffusion circuit in the plurality of floating diffusion circuits. The plurality of amplification transistors is configured to output signals based on potentials of the plurality of floating diffusion circuits.

26 Claims, 15 Drawing Sheets

PHOTOELECTRIC CONVERSION DEVICE HAVING SIGNAL READOUT CIRCUITS AND PHOTOELECTRIC CONVERSION SYSTEM

BACKGROUND

Technical Field

One disclosed aspect of the embodiments relates to a photoelectric conversion device having signal readout circuits and a photoelectric conversion system incorporating the photoelectric conversion device.

Description of the Related Art

International Publication No. WO 2020/105713 discusses a solid-state imaging element having a three-layered structure in which a plurality of pixels for performing photoelectric conversion is disposed on a first substrate, a readout circuit for outputting signals from the pixels is disposed on a second substrate, and a logic circuit for performing pixel signal processing is disposed on a third substrate.

In the case of adding or averaging pixel signals in the solid-state imaging element discussed in International Publication No. WO 2020/105713, there is a need to perform an operation to process signals read out to a vertical signal line. International Publication No. WO 2020/105713, however, does not discuss reducing power consumption for the operation.

SUMMARY

According to an aspect of the embodiments, a photoelectric conversion device includes a first substrate, a second substrate, a first signal line, a first signal readout circuit, a second signal line, and a second signal readout circuit. A plurality of photoelectric conversion circuits is disposed on the first substrate. A plurality of floating diffusion circuits connected to the plurality of photoelectric conversion circuits, a first switch configured to connect a first floating diffusion circuit and a second floating diffusion circuit in the plurality of floating diffusion circuits, and a plurality of amplification transistors configured to output signals based on potentials of the plurality of floating diffusion circuits are disposed on the second substrate. The first signal line is connected to a first amplification transistor in the plurality of amplification transistors. The first signal readout circuit is connected to the first signal line. The second signal line is connected to a second amplification transistor in the plurality of amplification transistors. The second signal readout circuit is connected to the second signal line. In a case where the first switch is in an off state, the first signal readout circuit and the second signal readout circuit are in an operating state. In a case where the first switch is in an on state, the first signal readout circuit is in a non-operating state.

According to another aspect of the embodiments, a photoelectric conversion device includes a first substrate and a second substrate. A plurality of photoelectric conversion circuits is disposed on the first substrate. A plurality of floating diffusion circuits, a first switch, and a plurality of amplification transistors are disposed on the second substrate. The plurality of floating diffusion circuits is connected to the plurality of photoelectric conversion circuits, respectively. The first switch is configured to connect a first floating diffusion circuit and a second floating diffusion circuit in the plurality of floating diffusion circuits. The plurality of amplification transistors is configured to output signals based on potentials of the plurality of floating diffusion circuits, respectively.

Further features of the disclosure will become apparent from the following description of exemplary embodiments with reference to the attached drawings.

DESCRIPTION OF THE EMBODIMENTS

Figure 1:
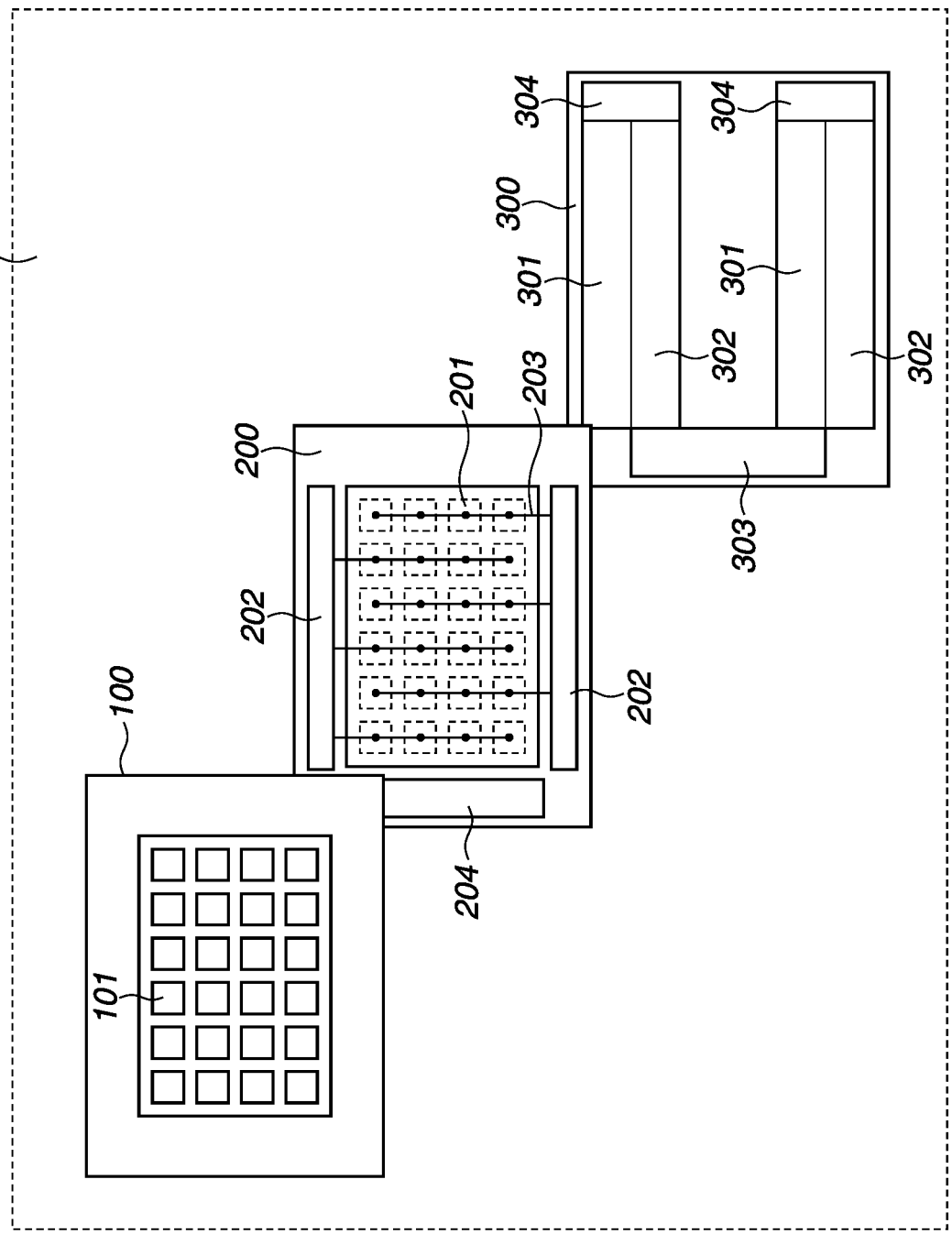
FIG. 1 is a schematic view of a photoelectric conversion device according to a first exemplary embodiment.

The following exemplary embodiments are exemplified to embody the technical idea of the disclosure, and are not intended to limit the disclosure. The sizes and positional relationships of members illustrated in the drawings may be exaggerated for clarity of illustration. In the following description, the same components are denoted by the same reference numerals, and descriptions thereof may be omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing circuit (CPU), or a specially designed programmable device or controller. A memory contains instructions or program that, when executed by the CPU, cause the CPU to perform operations corresponding to circuits or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

The following description is given assuming that signal charges are electrons. Accordingly, a semiconductor region of a first conductivity type in which carriers having the same conductivity type as that of signal charges are used as majority carriers is an n-type semiconductor region and a semiconductor region of a second conductivity type is a p-type semiconductor region. The technical effects of the disclosure can be achieved also in a case where signal charges are holes. In this case, the semiconductor region of the first conductivity type in which carriers having the same conductivity type as that of signal charges are used as majority carriers is the p-type semiconductor region, and the semiconductor region of the second conductivity type is the n-type semiconductor region.

The term "impurity concentration" simply used herein refers to a net impurity concentration, i.e., the concentration of an impurity that is compensated for by a reverse conductivity-type impurity. That is, the term "impurity concentration" refers to a net doping concentration. The region in which the concentration of a p-type additive impurity is higher than the concentration of an n-type additive impurity corresponds to the p-type semiconductor region. The region in which the concentration of an n-type additive impurity is higher than the concentration of a p-type additive impurity corresponds to the n-type semiconductor region. The conductivity type of a semiconductor region, the conductivity type of a well, and an implanted dopant to be described in the following exemplary embodiments are merely examples and are not limited only to the conductivity types and the dopant described in the exemplary embodiments. The conductivity types and the dopant described in the exemplary embodiments may be appropriately changed, and the potential of each of the semiconductor region and the well may be changed appropriately according to the change.

The term "plan view" used herein refers to a view in a direction perpendicular to a light incidence surface or a surface opposite of the light incidence surface of a semiconductor substrate to be described below. The term "section" used herein refers to a surface perpendicular to the light incidence surface of the semiconductor substrate. If the light incidence surface of the semiconductor substrate is a rough surface when the surface is viewed microscopically, the plan view is defined based on the light incidence surface of the semiconductor substrate when viewed microscopically.

The term "depth direction" used herein refers to a direction from the light incidence surface (first surface) of the semiconductor substrate to a surface (second surface) on which transistors are disposed.

In the following exemplary embodiments, an image capturing device will be mainly described as an example of a photoelectric conversion device. However, the exemplary embodiments are not limited to the image capturing device and are also applicable to other examples of the photoelectric conversion device. The other examples include a ranging device (device for measuring a distance using focus detection or time of flight (ToF)), and a photometric device (device for measuring the amount of incident light).

There is a case where a connection between circuit elements is described in the following exemplary embodiments. In this case, even when another element is interposed between elements of interest, it is assumed that the elements of interest are connected, unless otherwise stated. For example, when an element "A" is connected to one node of a capacitor element "C" including a plurality of nodes and an element "B" is connected to another node of the capacitor element "C", it is assumed that the element "A" and the element "B" are connected to each other, unless otherwise stated.

A first exemplary embodiment will be described with reference to FIGS. 1 to 6. FIG. 1 is a schematic view of a photoelectric conversion device 400 according to the first exemplary embodiment. The photoelectric conversion device 400 is a semiconductor device integrated circuit (IC).

The photoelectric conversion device 400 according to the first exemplary embodiment can be used as, for example, an image sensor, a photometric sensor, or a ranging sensor. In the following description, a complementary metal-oxide semiconductor (CMOS) image sensor will be described as an example.

The photoelectric conversion device 400 according to the first exemplary embodiment includes three layers of a first substrate 100, a second substrate 200, and a third substrate 300. Each of the first substrate 100 and the second substrate 200 may be provided as a chip obtained by dicing a wafer into a chip after lamination, or may be provided as a wafer.

A plurality of pixels 101 is arranged in an array on a semiconductor layer of the first substrate 100. While FIG. 1 illustrates an example where the pixels 101 are arranged in a pixel array of six columns×four rows for ease of illustration, the number of the pixels 101 forming the pixel array is not limited to this example. For example, the pixels 101 may be arranged in a pixel array of several thousands of rows× several thousands of columns, like in a CMOS image sensor used for typical digital cameras, or a plurality of pixels 101 arranged in a row may form the pixel array.

Pixel circuits 201, signal readout circuits 202, vertical signal lines 203, and a vertical scanning circuit 204 are arranged on the second substrate 200. A signal based on a pair of electric charges photoelectrically converted by each pixel 101 is read out to the signal readout circuits 202 via the pixel circuits 201 and the vertical signal lines 203. The plurality of pixels 101 arranged in one column of the pixel array is connected to one vertical signal line 203, and signals are read out from the pixels 101 in the row selected by the vertical scanning circuit 204.

Column signal processing circuits 301, horizontal scanning circuits 302, a timing generator (TG) 303, and output circuits 304 are arranged on the third substrate 300. Signals output from the signal readout circuits 202 arranged on the second substrate 200 are input to the column signal processing circuits 301 on the third substrate 300. Each column signal processing circuit 301 is, for example, an analog-to-digital (AD) conversion circuit.

Digital signals converted from analog signals are sequentially transferred to the output circuits 304 under control of the horizontal scanning circuits 302, and are output to the outside of the photoelectric conversion device 400. The TG 303 generates control signals for circuit blocks arranged on the second substrate 200 and the third substrate 300.

While the present exemplary embodiment is described based on an example where the photoelectric conversion device 400 includes three layers of substrates, the photoelectric conversion device 400 may have a two-layered structure in which the circuit blocks that are arranged on the second substrate 200 and the third substrate 300 in the three-layered structure may be arranged on one substrate. The signal readout circuits 202 and the vertical scanning circuit 204 may be arranged on the third substrate 300.

Figure 2:
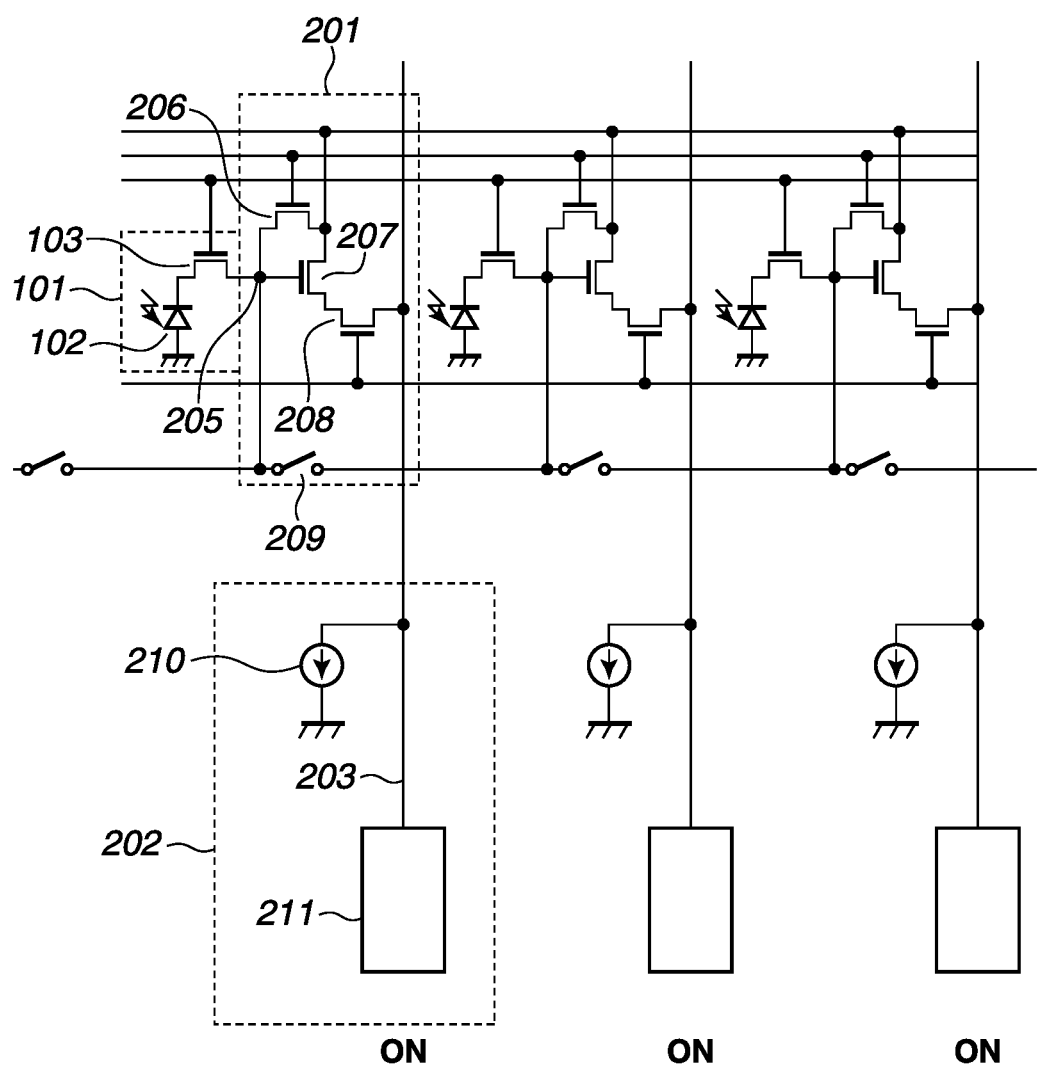
FIG. 2 is an equivalent circuit diagram of the photoelectric conversion device according to the first exemplary embodiment.

FIG. 2 is an equivalent circuit diagram illustrating a path from each pixel 101 to the corresponding signal readout circuit 202.

Each pixel 101 includes a photodiode 102 and a transfer transistor 103. Each pixel circuit 201 includes a floating diffusion (hereinafter referred to as "FD") 205, a reset transistor 206, an amplification transistor (source follower transistor) 207, a selection transistor 208, and an addition switch 209 that includes a transistor.

Each signal readout circuit 202 includes a current source 210 and an amplification circuit 211. In a case where there is no need to amplify signals, the signal readout circuit 202 may include only the current source 210.

The photodiode 102 generates electric charges by photoelectric conversion. The electric charges generated by photoelectric conversion are transferred by the transfer transistor 103 to the FD 205 in which the electric charges are held. The potential of the FD 205 is determined by the electric charges. The FD 205 is connected to the gate of the amplification transistor 207. Signals that are based on the electric charges held in the FD 205 are amplified by the amplification transistor 207. The amplified signals are read out to the vertical signal line 203 via the selection transistor 208 and are input to the signal readout circuit 202. The reset transistor 206 for resetting the potential of the FD 205 is connected to the FD 205. The vertical signal line 203 is connected to the current source 210 via a current source transistor (not illustrated). The current source 210 and the amplification transistor 207 form a source follower circuit.

While the components are illustrated in a planar manner in the equivalent circuit diagram of FIG. 2, the pixels 101 are arranged on the first substrate 100 and the pixel circuits 201, the vertical signal lines 203, and the signal readout circuits 202 are arranged on the second substrate 200 as illustrated in FIG. 1. The addition switch 209 that connects the FD 205 included in a certain pixel circuit 201 and the FD 205 included in another pixel circuit 201 in a pixel column different from the pixel column in which the certain pixel circuit 201 is located is also arranged on the second substrate 200. When the addition switch 209 is turned on, addition averaging processing of adding signal charges held in the FD 205 of each pixel circuit 201 and averaging signal values is carried out.

Figure 3:
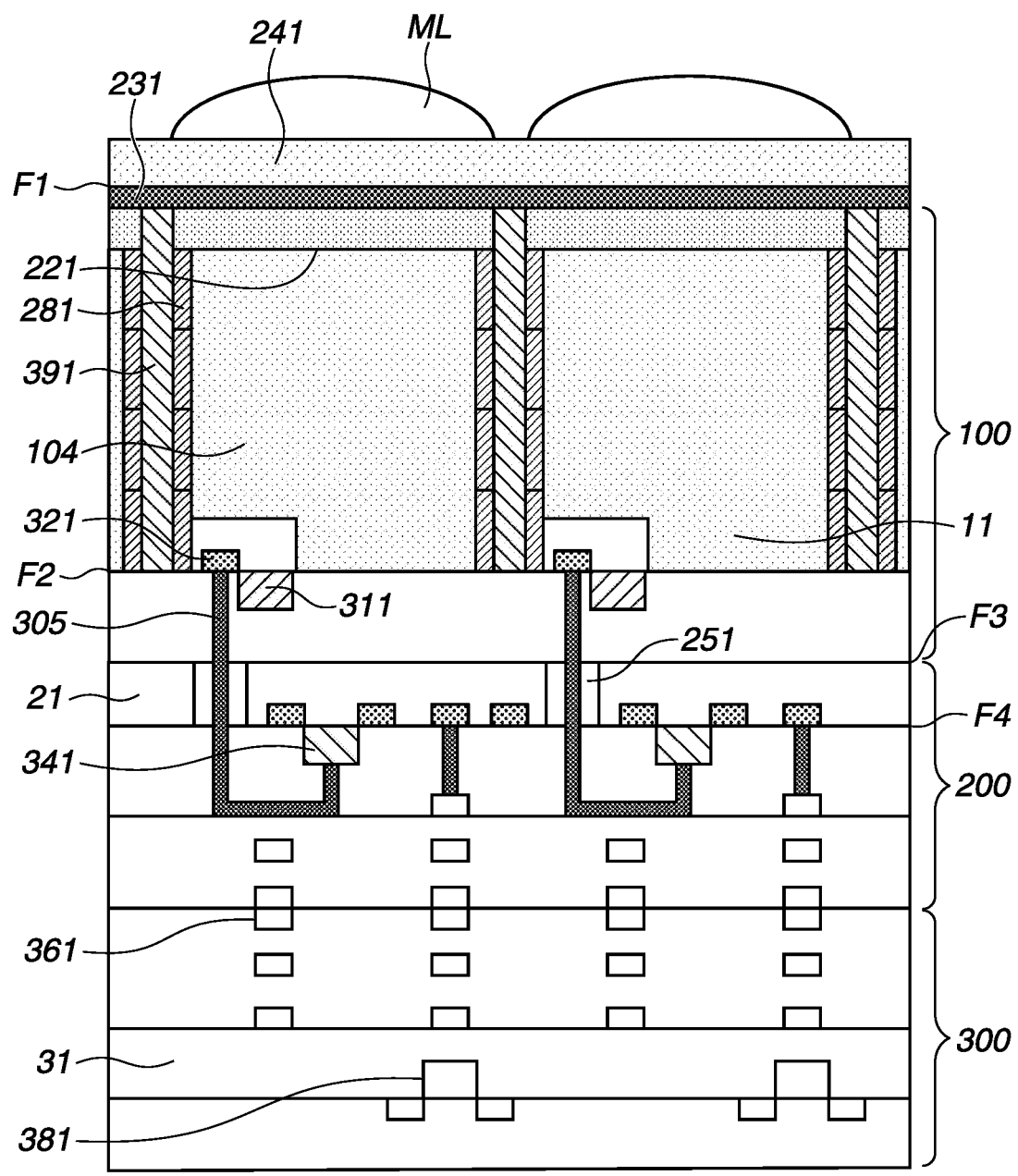
FIG. 3 is a sectional view of the photoelectric conversion device according to the first exemplary embodiment.

FIG. 3 is a sectional view of the photoelectric conversion device 400 according to the present exemplary embodiment. This sectional view illustrates a section taken along a line that passes through the photodiode 102 and the gate of the transfer transistor 103 in the first substrate 100, the second substrate 200, and the third substrate 300. A semiconductor region 104 corresponds to the photodiode 102. In other words, the semiconductor region 104 functions as a photoelectric conversion unit or circuit that generates signal charges (electrons in the present exemplary embodiment) based on incident light and accumulates the signal charges. The semiconductor region 104 is an n-type impurity region. The sectional view of FIG. 3 illustrates two pixels 101 appearing in one section.

A transfer gate 311 of the transfer transistor 103 controls a conductive state between the semiconductor region 104 and a semiconductor region 321 that is a region of the FD 205. The semiconductor region 321 is an n-type semiconductor region. A pixel separation portion 391 is provided between a plurality of semiconductor regions 104, and electrically separates the semiconductor regions 104 from each other. The pixel separation portion 391 may include an insulating portion made of, for example, silicon oxide, or may be a semiconductor region that forms a potential barrier. Typically, the pixel separation portion 391 is a semiconductor region in which electric charges having a polarity opposite to that of signal charges accumulated in the photodiode 102 are used as main carriers. A pixel separation layer 281 is provided between the pixel separation portion 391 and the semiconductor region 104. Particularly, in a case where the pixel separation portion 391 includes an insulating portion, the pixel separation layer 281 functions to reduce a dark current. The semiconductor region 321 corresponding to the FD 205 and a gate 341 of the amplification transistor 207 are connected to each other via a conductor 305. The conductor 305 mainly contains metal such as tungsten or copper. The conductor 305 penetrates through an insulator 251 that separates a semiconductor layer 21 of the second substrate 200. The insulator 251 electrically separates the plurality of signal readout circuits 202. The insulator 251 penetrates through a third surface and a fourth surface of the semiconductor layer 21. The third surface is a surface (F3) opposed to a semiconductor layer 11, and the fourth surface is a surface (F4) opposed to the third surface. The gate 341 of the amplification transistor 207 is provided on the fourth surface of the semiconductor layer 21.

The semiconductor layer 11 of the first substrate 100 includes a first surface (F1) corresponding to the light incidence surface, and a second surface (F2) opposed to the first surface. A semiconductor region 221 is a p-type semiconductor region provided on the first surface (light incidence surface) of the semiconductor region 104. A fixed-charge membrane 231 is provided on the first surface of the semiconductor layer 11. The semiconductor region 221 and the fixed-charge membrane 231 reduce the dark current flowing into the semiconductor region 104.

Each microlens ML guides light to the semiconductor region 104. A planarization layer 241 is provided between each microlens ML and the fixed-charge membrane 231. Further, the pixels 101 may be each provided with color filters, to perform color separation.

The first substrate 100, the second substrate 200, and the third substrate 300 are stacked on one another. The second substrate 200 is provided between the first substrate 100 and the third substrate 300. A semiconductor layer 31 of the third substrate 300 is provided with transistors 381. The second substrate 200 and the third substrate 300 are electrically connected via connecting portions 361. Each connecting portion 361 is formed of metal. Typically, each connecting portion 361 mainly includes copper. Each connecting portion 361 further includes barrier metal (such as titanium, nickel, or tantalum) to prevent diffusion of copper.

Figure 4:
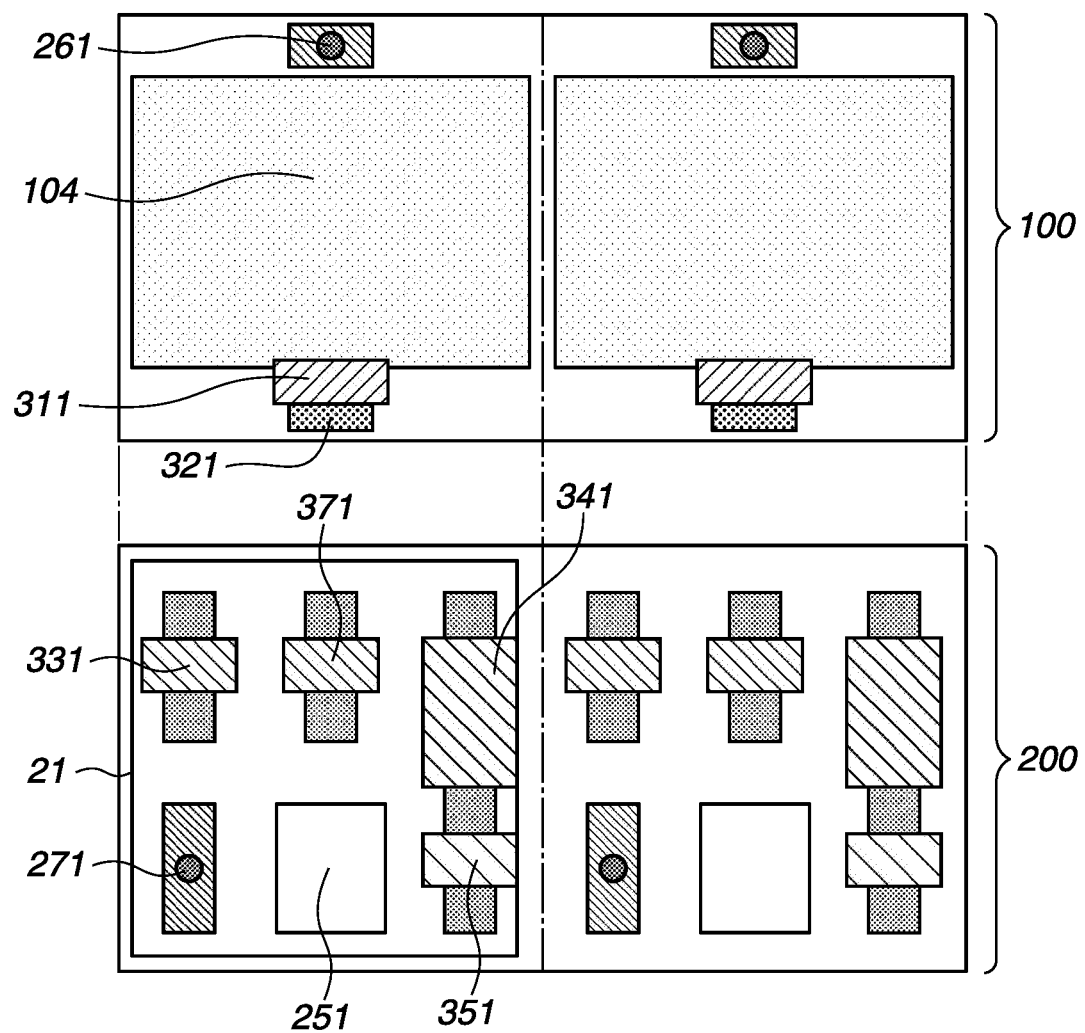
FIG. 4 is a plan view of the photoelectric conversion device according to the first exemplary embodiment.

FIG. 4 illustrates a plan view of the photoelectric conversion device 400 illustrated in FIGS. 1 to 3 when the second surface of the first substrate 100 illustrated in FIG. 3 is viewed from the side where the semiconductor layer 21 is located, which is combined with a plan view when the second substrate 200 is viewed from the side where the third substrate 300 is located. The members illustrated in FIG. 4 that have the same functions as those of the members illustrated in FIGS. 1 to 3 are denoted by the same reference numerals as in FIGS. 1 to 3.

The transfer gate 311 is provided in one semiconductor region 104 functioning as the photodiode 102. The gate 341 of the amplification transistor 207 in one readout circuit 202 is connected to one semiconductor region 104 and the semiconductor region 321 corresponding to one FD 205.

A well region in the semiconductor layer 11 of the first substrate 100 is provided with a well contact 261 to provide a predetermined potential (typically, a ground potential).

The semiconductor layer 21 of the second substrate 200 is provided with the gate 341 of the amplification transistor 207 and a gate 351 of the selection transistor 208, and is also provided with a gate 371 of the transistor forming the addition switch 209 and a gate 331 of the reset transistor 206. A well region in the semiconductor layer 21 of the second substrate 200 is provided with a well contact 271 to provide a predetermined potential (typically, a ground potential).

A driving method for adding or averaging pixel signals in the configuration according to the present exemplary embodiment will be described with reference to FIGS. 5 and 6. In configuration examples illustrated in FIGS. 5 and 6, three pixel columns in the pixel array are focused and circuit elements in the columns are represented by "a", "b", and "c", respectively. The pixels 101 are arranged in a matrix. However, for ease of illustration, only the pixels 101 in one row are illustrated.

Figure 5:
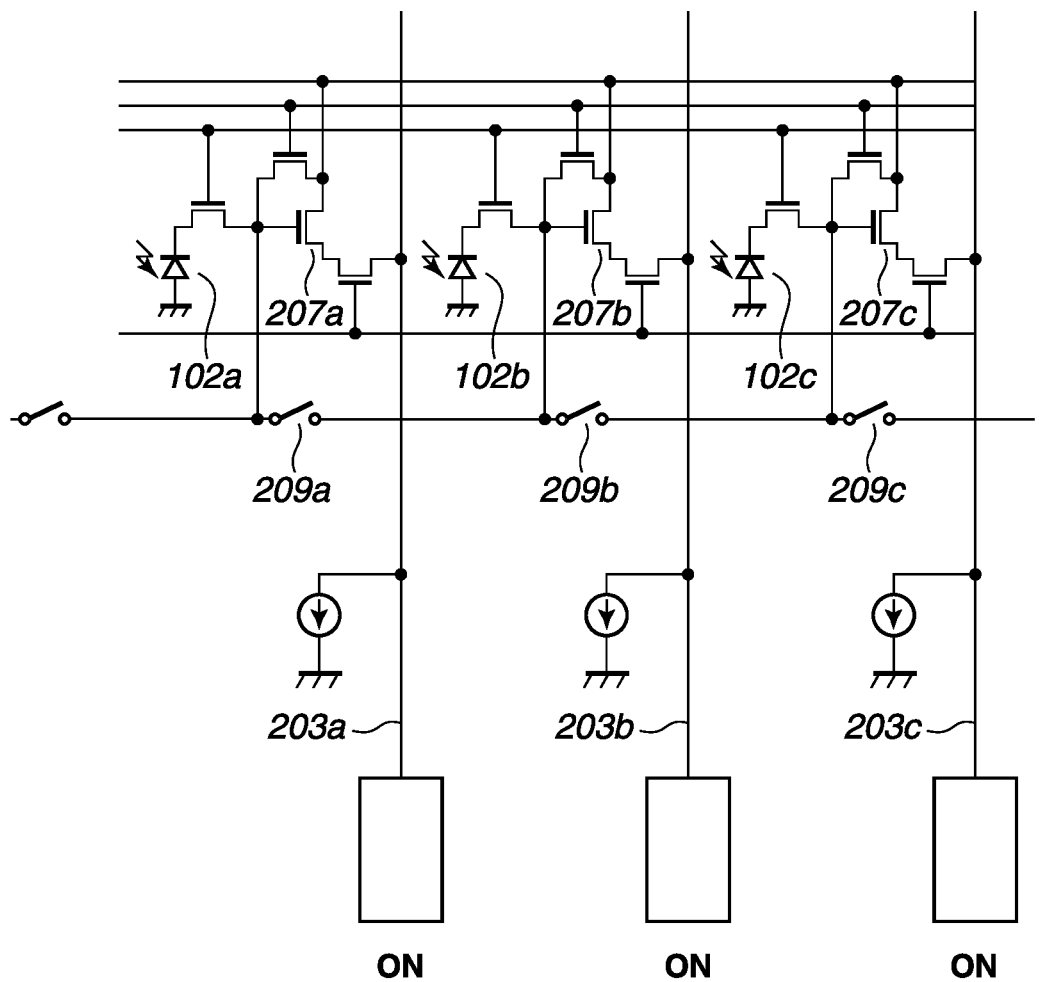
FIG. 5 is a circuit diagram illustrating a state during a normal operation of the photoelectric conversion device according to the first exemplary embodiment.

FIG. 5 is a circuit diagram illustrating a state of each pixel circuit during a normal operation of the photoelectric conversion device 400 according to the first exemplary embodiment. The normal operation is a circuit operation in which pixel signals are not added or averaged. In the normal operation, signal charges generated in each pixel 101 are converted into a voltage by the FD 205 included in the pixel circuit 201 of each pixel 101, and the voltage is output to the corresponding vertical signal line 203.

Figure 6:
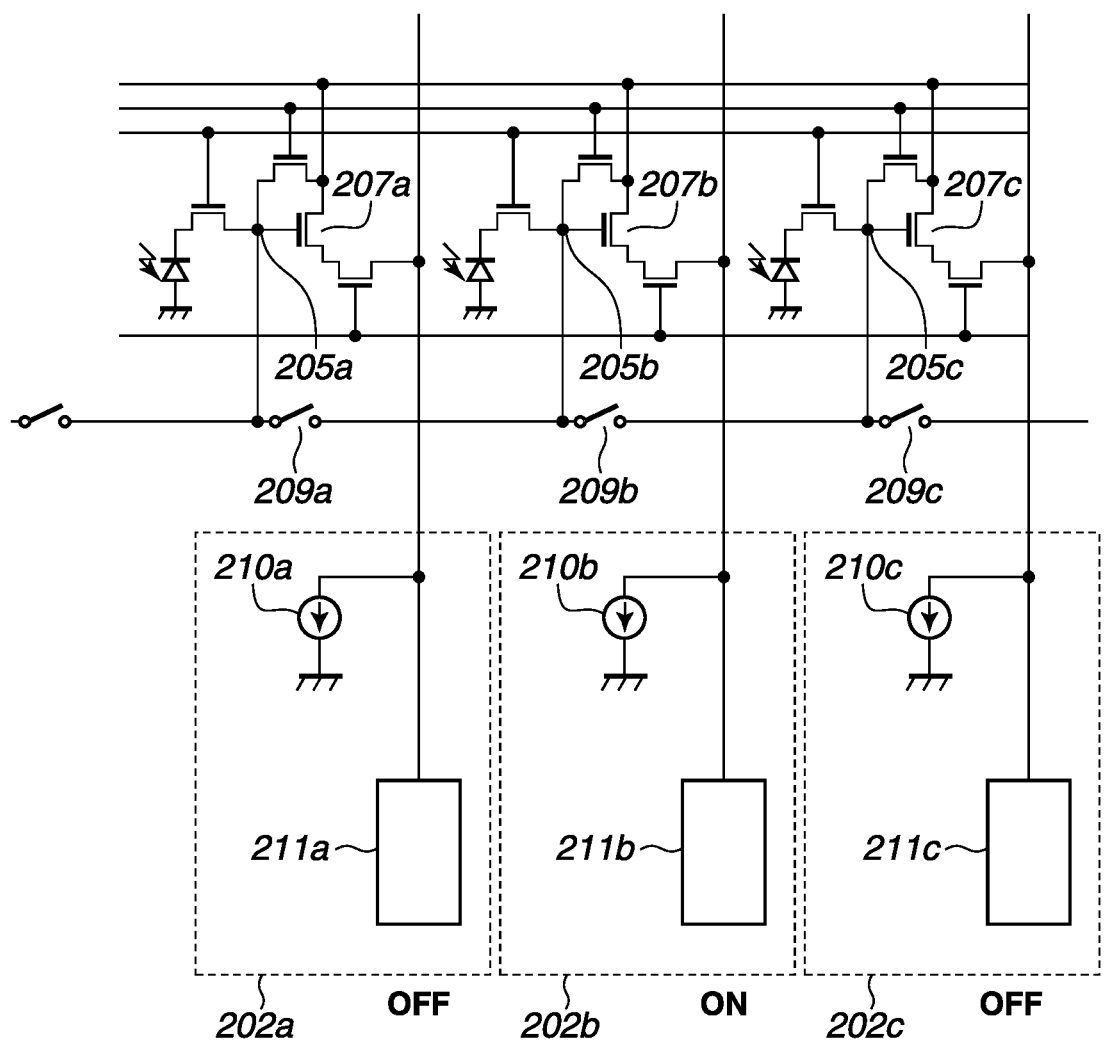
FIG. 6 is a circuit diagram illustrating a state during an addition or averaging operation in the photoelectric conversion device according to the first exemplary embodiment.

A photodiode 102a located in the column "a" at the left end in FIGS. 5 and 6 is connected to a first signal line 203a via an FD 205a serving as a first floating diffusion unit or circuit and a first amplification transistor 207a. The first signal line 203a is connected to a first signal readout circuit 202a including a first current source 210a and a first amplification circuit 211a. The first signal line 203a is connected to the first current source 210a via a first current source transistor (not illustrated).

A photodiode 102b located in the central column "b" in FIGS. 5 and 6 is connected to a second signal line 203b via an FD 205b serving as a second floating diffusion unit or circuit and a second amplification transistor 207b. The second signal line 203b is connected to a second signal readout circuit 202b including a second current source 210b and a second amplification circuit 211b. The second signal line 203b is connected to the second current source 210b via a second current source transistor (not illustrated).

Similarly, a photodiode 102c located in the column "c" at the right end in FIGS. 5 and 6 is connected to a third signal line 203c via an FD 205c serving as a third floating diffusion unit or circuit and a third amplification transistor 207c. The third signal line 203c is connected to a third signal readout circuit 202c including a third current source 210c and a third amplification circuit 211c. The third signal line 203c is connected to the third current source 210c via a third current source transistor (not illustrated).

An addition switch 209a serving as a first switch that connects the FD 205a and the FD 205b is provided in the column "a". An addition switch 209b serving as a second switch that connects the FD 205b and the FD 205c is provided in the column "b". An addition switch 209c connects the FD 205c and the FD 205 corresponding to a pixel 101 in a pixel column (not illustrated).

In the normal operation, the addition switches 209a, 209b, and 209c are turned off, so that pixel signals are not added or averaged. Specifically, signal charges generated in the photodiodes 102a, 102b, and 102c are read out to the vertical signal lines 203a, 203b, 203c, respectively, in the respective columns.

FIG. 6 is a circuit diagram illustrating a state of each pixel circuit 201 when the photoelectric conversion device according to the first exemplary embodiment adds or averages pixel signals. FIG. 6 illustrates an example where pixel signals in the three columns "a" to "c" are added or averaged.

In the example illustrated in FIG. 6, the addition switch 209a and the addition switch 209b are turned on and the addition switch 209c is turned off. When the addition switches 209a and 209b are turned on, the FD 205a, the FD 205b, and the FD 205c are electrically connected. When the FD 205a, the FD 205b, and the FD 205c are electrically connected, the electric charges held in the FD 205a, the FD 205b, and the FD 205c are added and are read out to the corresponding signal readout circuit 202 through the amplification transistor 207. At this time, the signal readout circuits 202a and 202c are brought into a non-operating state and the amount of current to be supplied from the current sources 210a and 210c is set to be smaller than that in an operating state, thereby allowing the added signals to be read out to the signal readout circuit 202b via the amplification transistor 207b. The phrase "the amount of current to be supplied from the current source 210 is smaller" indicates that the amount of current is smaller than that when the signal readout circuit 202 is in the operating state. Examples of this case include a case where the current source 210 and the current source transistor (not illustrated) are brought into a non-conductive state to prevent a current from flowing to the signal readout circuit 202. When the addition switches 209 are brought into a conductive state and the electric charges held in the FDs 205 are added, the signal readout circuits 202 in columns other than the column from which signals are read out are brought into the non-operating state to reduce the amount of current to be supplied from the current source 210, which leads to a reduction in power consumption.

The provision of the addition switch 209 on the second substrate 200 as illustrated in FIGS. 5 and 6 eliminates the need for providing a gate contact to form the addition switch 209 on the first substrate 100. Consequently, the effect of reducing stray light generated in the vicinity of the gate contact can be obtained.

While the description above has been given of an example where the signal readout circuits 202a and 202c are brought into the non-operating state when the addition switch 209 is turned on, the circuits to be brought into the non-operating state are not limited to the signal readout circuits 202a and 202c. For example, only the current source 210 may be brought into the non-operating state, or only the amplification circuit 211 may be brought into the non-operating state. In the present exemplary embodiment, the addition switch 209 is turned off every three pixels. However, the number of pixels in which the electric charges held in the FDs 205 are added is not limited to three. The number of pixels in which the addition switch 209 is turned off can be arbitrarily determined, as long as the FDs 205 in two or more pixels can be connected.

A photoelectric conversion device according to a second exemplary embodiment will be described with reference to FIG. 7. Descriptions of components that are the same as those in the first exemplary embodiment are omitted, and differences between the first exemplary embodiment and the second exemplary embodiment will be mainly described.

Figure 7:
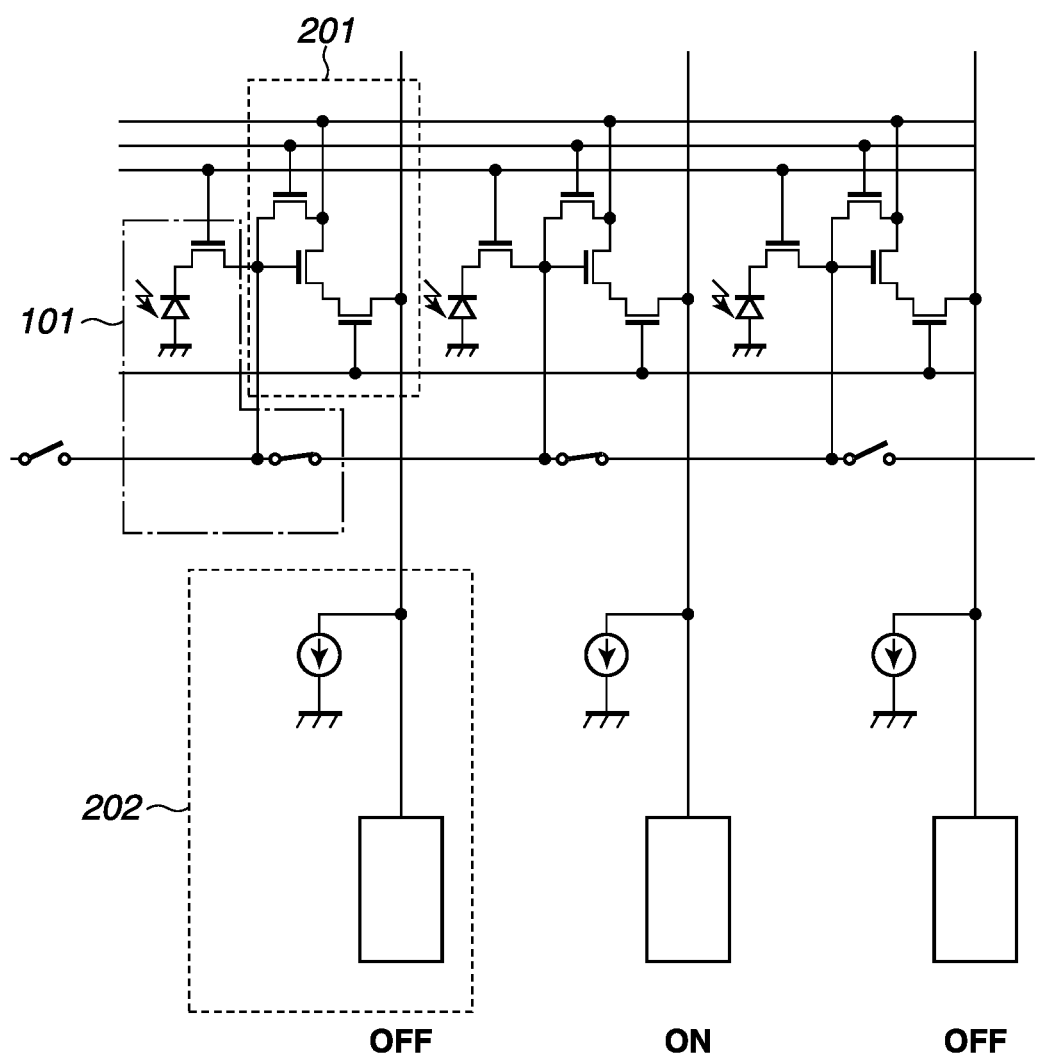
FIG. 7 is a circuit diagram illustrating a state during an addition or averaging operation in a photoelectric conversion device according to a second exemplary embodiment.

FIG. 7 is a circuit diagram illustrating a state of each pixel circuit 201 when the photoelectric conversion device according to the second exemplary embodiment adds or averages pixel signals. The photoelectric conversion device according to the second exemplary embodiment includes the addition switch 209 as an element of each pixel 101. In other words, the addition switch 209 is provided on the first substrate 100.

The provision of the addition switch 209 on the first substrate 100 makes it possible to increase the size of the amplification transistor 207 mounted on each pixel circuit 201. Consequently, the effect of reducing noise, such as random telegraph signal (RTS) noise, generated in the pixels 101 and the pixel circuits 201, as well as the effect of reducing the power consumption described in the first exemplary embodiment can be obtained.

A photoelectric conversion device according to a third exemplary embodiment will be described with reference to FIGS. 8 and 9. Descriptions of components that are the same as those in the first exemplary embodiment are omitted, and differences between the first exemplary embodiment and the third exemplary embodiment will be mainly described. The third exemplary embodiment differs from the first exemplary embodiment in that pixel signals can be added or averaged not only in the horizontal direction, but also in the vertical direction.

Figure 8:
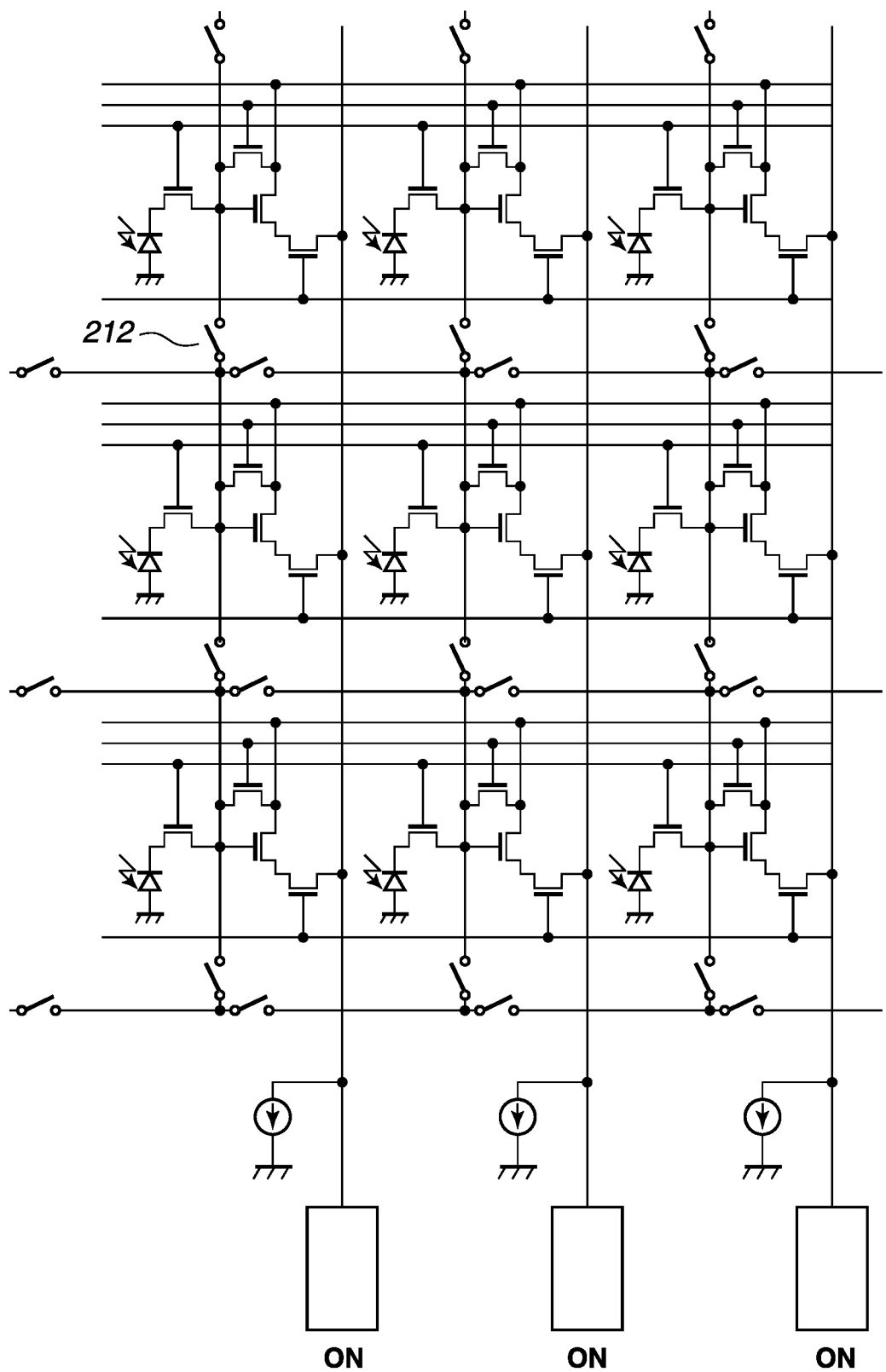
FIG. 8 is a circuit diagram illustrating a circuit configuration example of a photoelectric conversion device according to a third exemplary embodiment.

FIG. 8 is a circuit diagram illustrating a state of each pixel circuit 201 during the normal operation of the photoelectric conversion device according to the third exemplary embodiment. In the two-dimensionally arranged pixels 101 and pixel circuits 201, nine pixels arranged in a pixel array of three rows×three columns are focused.

An FD 205d serving as a fourth floating diffusion unit or circuit is connected to the first signal line 203a to which the FD 205a serving as the first floating diffusion circuit is connected. An addition switch 212a serving as a third switch that connects the FD 205a and the FD 205d is provided. Similarly, an addition switch 212 that can connect the FDs 205 in the pixel circuits 201 of the pixels 101 arranged in a pixel array of three rows×three columns is provided in each pixel.

As illustrated in FIG. 8, when the addition switches 209 and the addition switches 212 are turned off, the photoelectric conversion device is normally driven to read out signal charges output from each photodiode 102 into the vertical signal line 203 corresponding to the pixel column to which the photodiode 102 belongs.

Figure 9:
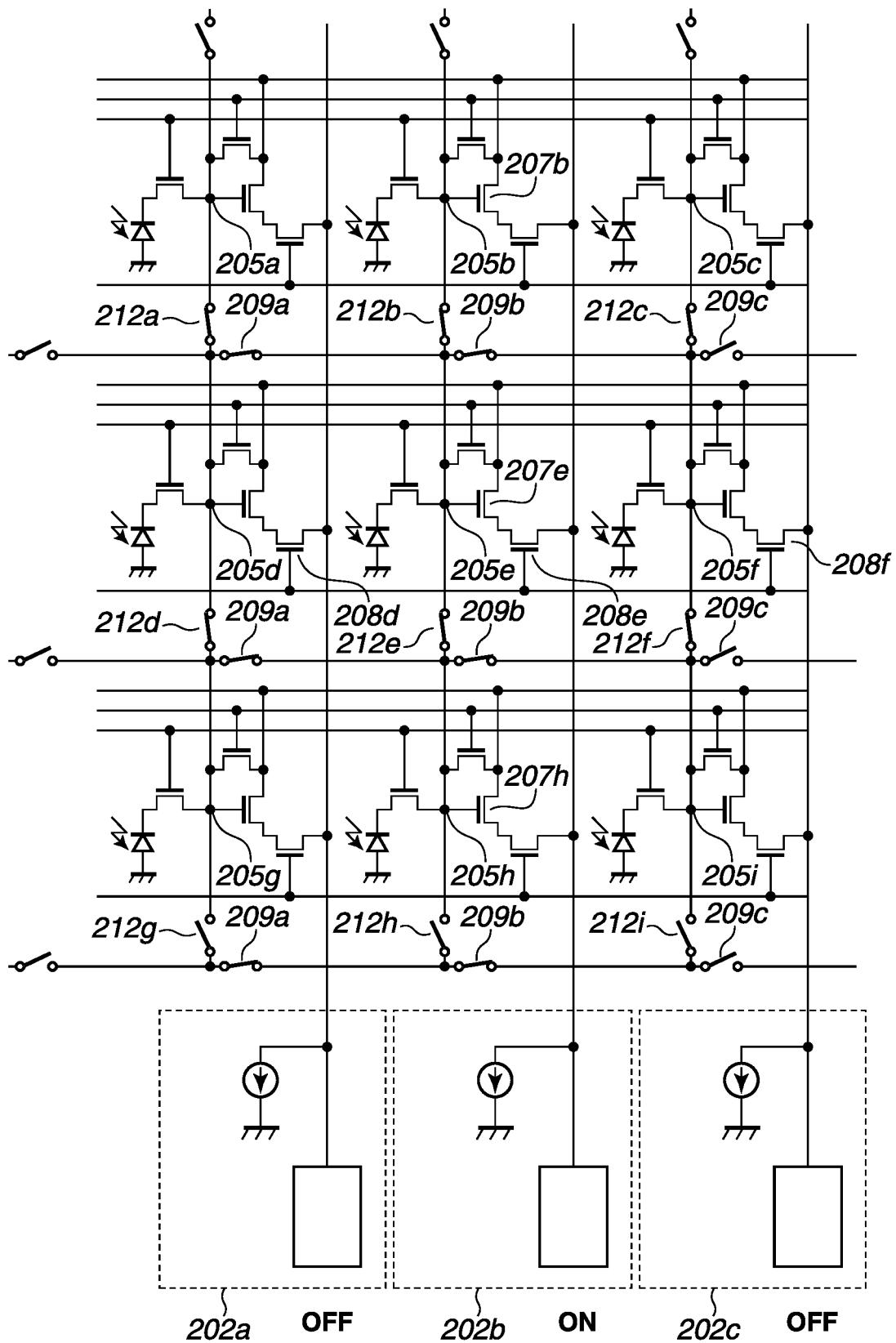
FIG. 9 is a circuit diagram illustrating a state during an addition or averaging operation in a photoelectric conversion device according to the third exemplary embodiment.

FIG. 9 is a circuit diagram illustrating a state of each pixel circuit 201 when the photoelectric conversion device according to the third exemplary embodiment adds or averages pixel signals. The description will be given of an example where signals from pixels arranged in a pixel array of three rows×three columns are added or averaged and the signals are output from the vertical signal line 203 corresponding to the central pixel column.

In the 3×3 pixels, addition switches 212a, 212b, 212c, 212d, 212e, and 212f and the addition switches 209a and 209b are turned on. Addition switches 212g, 212h, and 212i and the addition switch 209c are turned off. In this case, selection transistors 208d, 208e, and 208f are selected.

In an amplification transistor 207e, the electric charges held in the FD 205a, the FD 205b, the FD 205c, the FD 205d, an FD 205e, an FD 205f, an FD 205g, an FD 205h, and an FD 205i are added. The added or averaged electric charges are read out to the signal readout circuit 202b via the vertical signal line 203.

In this case, the addition switches 212 and the addition switches 209 may be provided on the first substrate 100 or the second substrate 200. The addition switches 212 and the addition switches 209 may be provided on different substrates, respectively. For example, the addition switches 212 may be provided on the first substrate 100 and the addition switches 209 may be provided on the second substrate 200. While in the present exemplary embodiment, the description has been described of an example where signals from the pixels arranged in the pixel array of three rows×three columns are added, the number of pixels to be added or averaged is not limited to this example.

According to the present exemplary embodiment, it is possible to perform the driving operation for adding or averaging signals not only in the horizontal direction, but also in the vertical direction, while reducing the power consumption.

A photoelectric conversion device according to a fourth exemplary embodiment will be described with reference to FIG. 10. Descriptions of components that are the same as those in the first exemplary embodiment are omitted, and differences between the first exemplary embodiment and the fourth exemplary embodiment will be mainly described.

Figure 10:
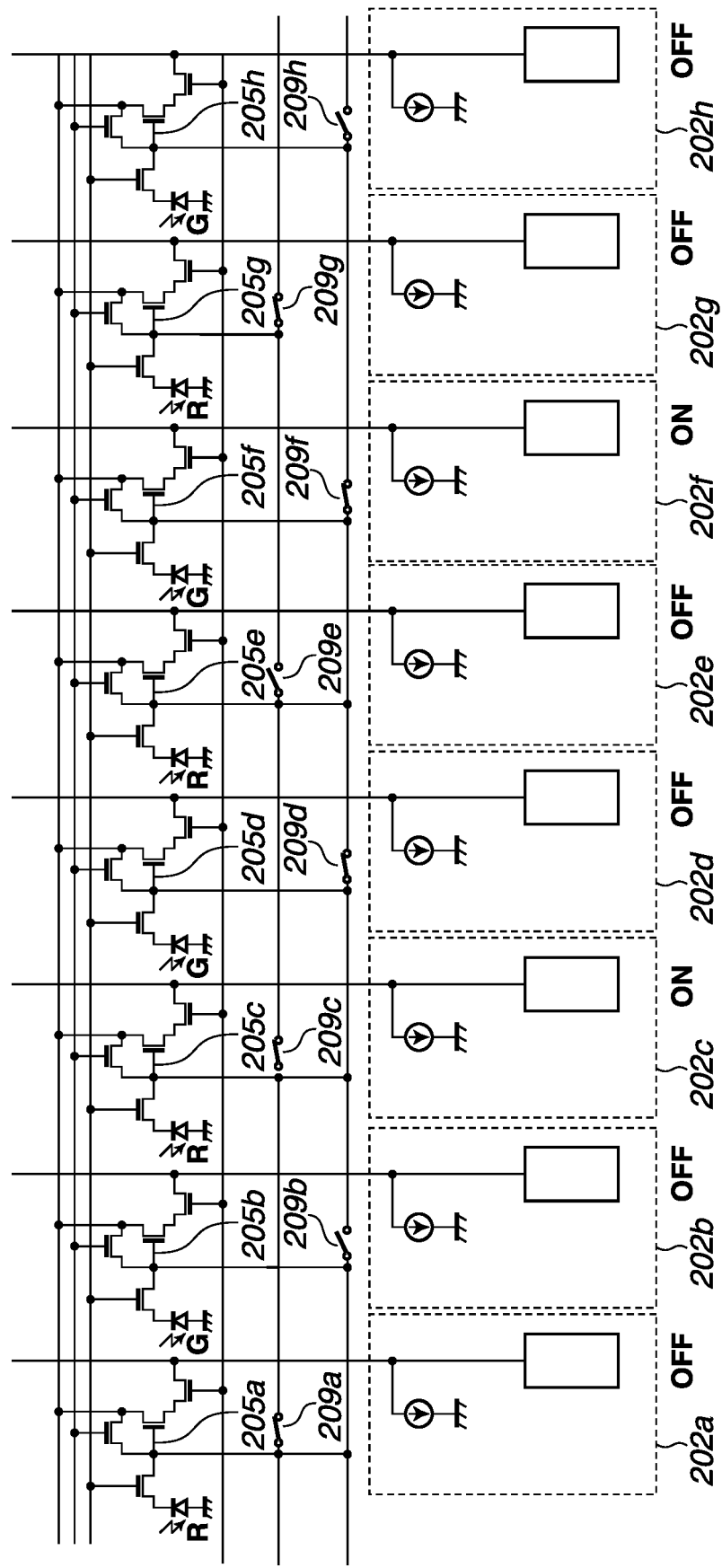
FIG. 10 is a circuit diagram illustrating a state during an addition or averaging operation in a photoelectric conversion device according to a fourth exemplary embodiment.

FIG. 10 is a circuit diagram illustrating a configuration example of each pixel circuit 201 when the photoelectric conversion device according to the fourth exemplary embodiment adds or averages pixel signals. In the configuration example illustrated in FIG. 10, eight pairs of the pixel 101 and the signal readout circuit 202 are arranged in one row×eight columns. Columns "a" to "h" are set in this order from the left end in FIG. 10. The pixels 101 are provided with color filters arranged in a Bayer array on the light incidence surface. In the example illustrated in FIG. 10, the pixels 101 are arranged only in the horizontal direction. Accordingly, red and green color filters corresponding to the respective pixels 101 are alternately arranged.

In the present exemplary embodiment, each addition switch 209 is provided to connect the pixels 101 including the color filters of the same color. Specifically, respective addition switches 209 are connected between FDs 205 corresponding to the pixels 101 where the red color filter are mounted, i.e., between the FD 205a and the FD 205c, between between the FD 205c and the FD 205e, and between the FD 205e and the FD 205g. Similarly, respective addition switches 209 are connected between FDs 205 corresponding to the pixels 101 where the green color filters are mounted, i.e., between the FD 205*b* and the FD 205*d*, between the FD 205*d* and the FD 205*f*, and between the FD 205*f* and the FD 205*h*.

An example where pixel signals are added every three columns will be described. The addition switches 209*a*, 209*c*, 209*g*, 209*d*, and 209*f* are turned on and the addition switches 209*e*, 209*b*, and 209*h* are turned off. In this case, the signal readout circuits 202*c* and 202*f* are brought into the operating state and the signal readout circuits 202*a*, 202*b*, 202*d*, 202*e*, 202*g*, and 202*h* are brought into the non-operating state. Thus, three columns of red pixels to be added are read out via the signal readout circuits 202 corresponding to the central pixel column. Similarly, three columns of green pixels to be added are read out via the signal readout circuits 202 corresponding to the central pixel column. The signal readout circuits that are used to read out signals and the signal readout circuits that are not used to read out signals are uniformly arranged by controlling the on/off state of each addition switch 209 and the operating state and the non-operating state of each signal readout circuit 202. In other words, each column circuit corresponding to the color centroid of each color is brought into the operating state and used to read out signals. In the example illustrated in FIG. 10, red or green column circuits in the operating state are uniformly arranged every three columns. Addition signals or averaging signals for each color are output at predetermined intervals, thereby preventing deterioration in image quality. Consequently, the photoelectric conversion device according to the present exemplary embodiment can improve the image quality, while reducing the power consumption.

While in the present exemplary embodiment, the description has been given of an example where pixels are arranged in the pixel array of one row×eight columns, signals may also be read out from rows and columns corresponding to the color centroids in the pixels 101 two-dimensionally arranged as described in the third exemplary embodiment.

Figure 11:
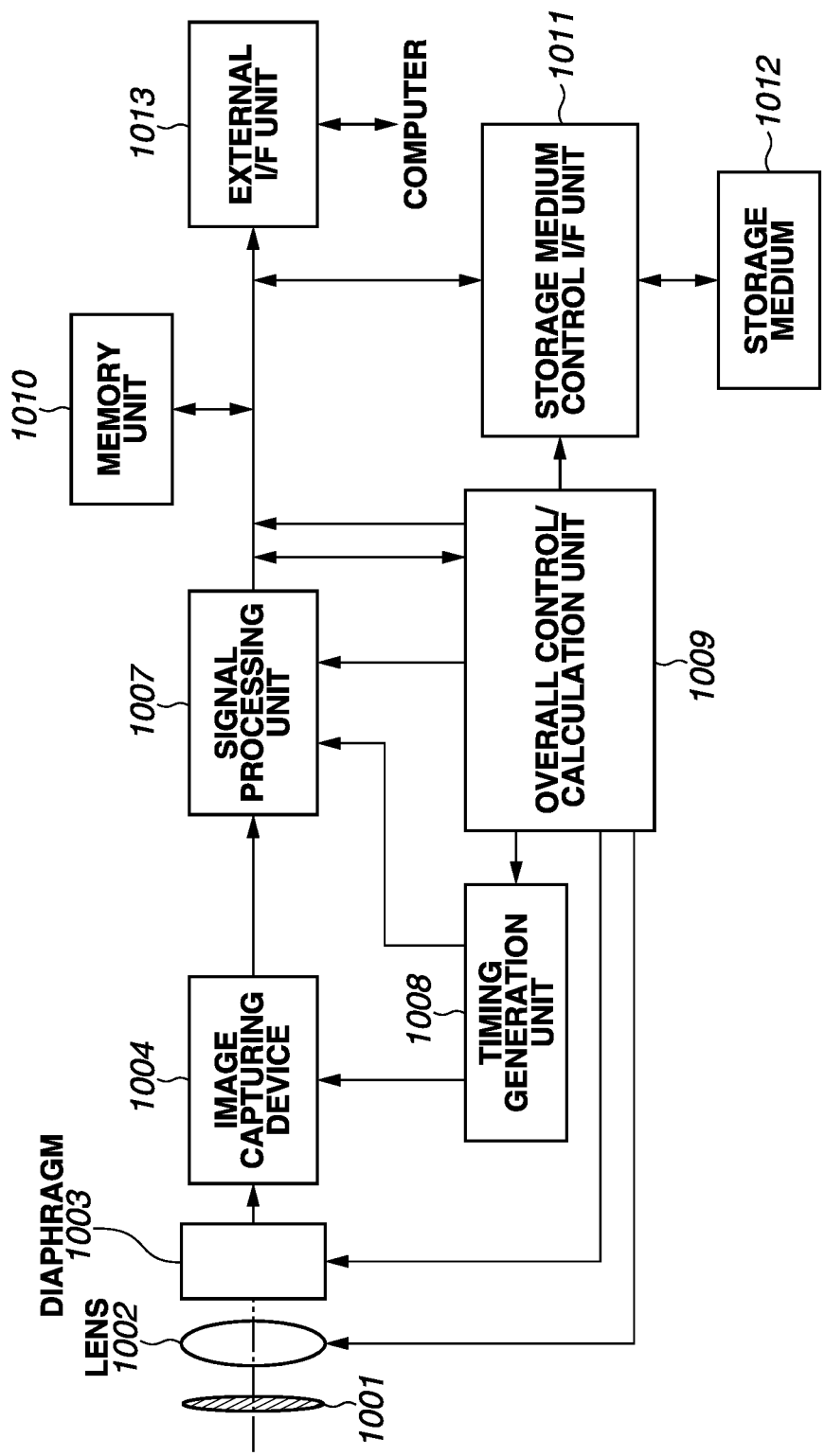
FIG. 11 is a functional block diagram of a photoelectric conversion system according to a fifth exemplary embodiment.

A photoelectric conversion system according to a fifth exemplary embodiment will be described with reference to FIG. 11. FIG. 11 is a block diagram schematically illustrating a configuration example of the photoelectric conversion system according to the fifth exemplary embodiment.

The photoelectric conversion devices according to the first to fifth exemplary embodiments can be applied to various photoelectric conversion systems. Examples of various applicable photoelectric conversion systems include a digital still camera, a digital camcorder, a monitoring camera, a copying machine, a facsimile machine, a mobile phone, an on-vehicle camera, and an observation satellite. The various applicable photoelectric conversion systems also include a camera module including an optical system such as a lens and an image capturing device. FIG. 11 is a block diagram illustrating a digital still camera as an example.

The photoelectric conversion system illustrated in FIG. 11 includes an image capturing device 1004 as an example of the photoelectric conversion device, and a lens 1002 that forms an optical image of an object on the image capturing device 1004. The photoelectric conversion system further includes a diaphragm 1003 configured to change the amount of light that passes through the lens 1002, and a barrier 1001 for protecting the lens 1002. The lens 1002 and the diaphragm 1003 constitute an optical system that focuses light on the image capturing device 1004. The image capturing device 1004 is any of the photoelectric conversion devices according to the above-described exemplary embodiments, and converts an optical image formed by the lens 1002 into an electric signal.

The photoelectric conversion system further includes a signal processing unit or circuit 1007 serving as an image generation unit or circuit that generates an image by performing processing on an output signal output from the image capturing device 1004. The signal processing circuit 1007 performs an operation of performing various correction and compression processes as needed, and outputting image data. The signal processing circuit 1007 may be formed on a semiconductor substrate on which the image capturing device 1004 is provided, or may be formed on another semiconductor substrate different from the semiconductor substrate on which the image capturing device 1004 is provided.

The photoelectric conversion system further includes a memory unit or circuit 1010 for temporarily storing image data, and an external interface (I/F) unit or circuit 1013 for communicating with an external computer or the like. The photoelectric conversion system further includes a storage medium 1012 such as a semiconductor memory for recording or reading out captured image data, and a storage medium control OF unit or circuit 1011 for recording data on the storage medium 1012 or reading out data from the storage medium 1012. The storage medium 1012 may be incorporated in the photoelectric conversion system, or may be detachably attached to the photoelectric conversion system.

The photoelectric conversion system further includes an overall control/calculation unit or circuit 1009 that performs various calculations and controls the overall operation of the digital still camera, and a timing generation unit or circuit 1008 that outputs various timing signals to the image capturing device 1004 and the signal processing circuit 1007. The timing signals may be input from an external device. The photoelectric conversion system only needs to include at least the image capturing device 1004 and the signal processing circuit 1007 that processes the output signal output from the image capturing device 1004.

The image capturing device 1004 outputs a captured image signal to the signal processing circuit 1007. The signal processing circuit 1007 performs predetermined signal processing on the captured image signal output from the image capturing device 1004, and outputs image data. The signal processing circuit 1007 generates an image using the captured image signal.

Thus, according to the present exemplary embodiment, it is possible to provide a photoelectric conversion system to which the photoelectric conversion device (image capturing device) according to any one of the above-described exemplary embodiments is applied.

Figure 12A:
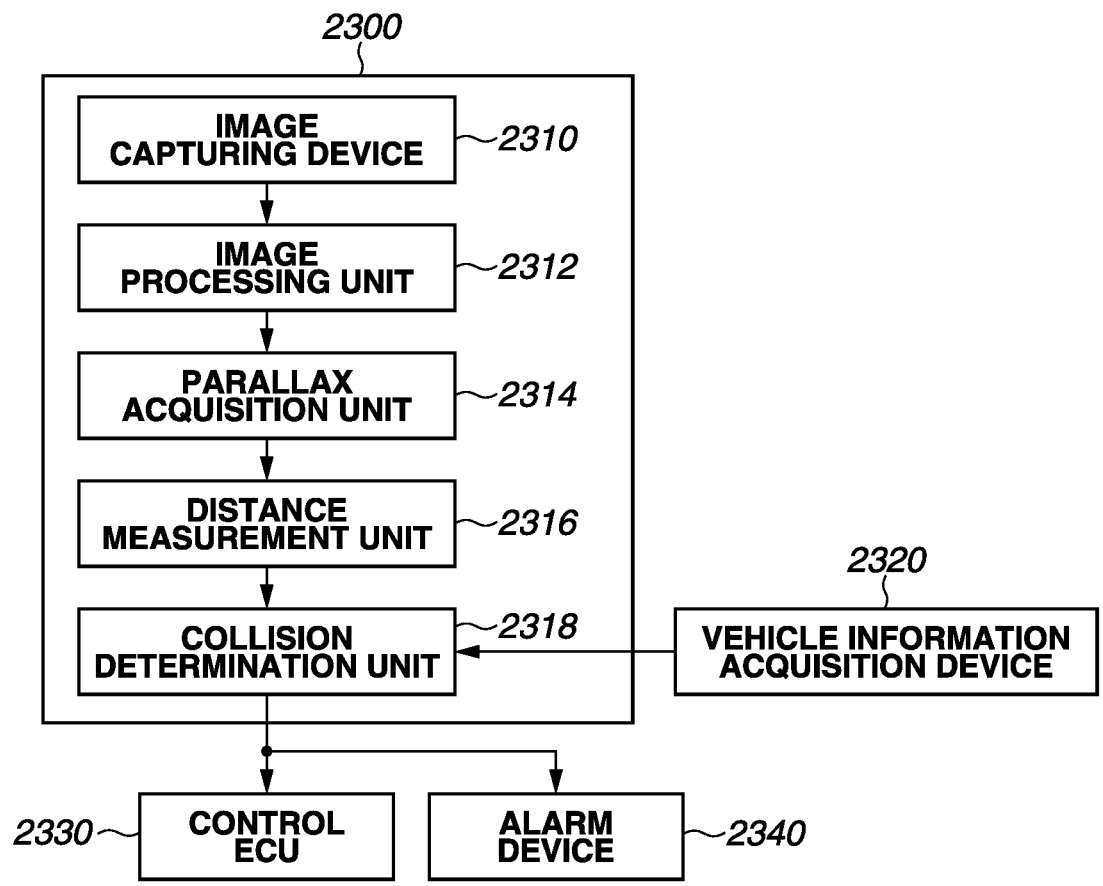
FIGS. 12A and 12B are functional block diagrams of a photoelectric conversion system according to a sixth exemplary embodiment.
Figure 12B:
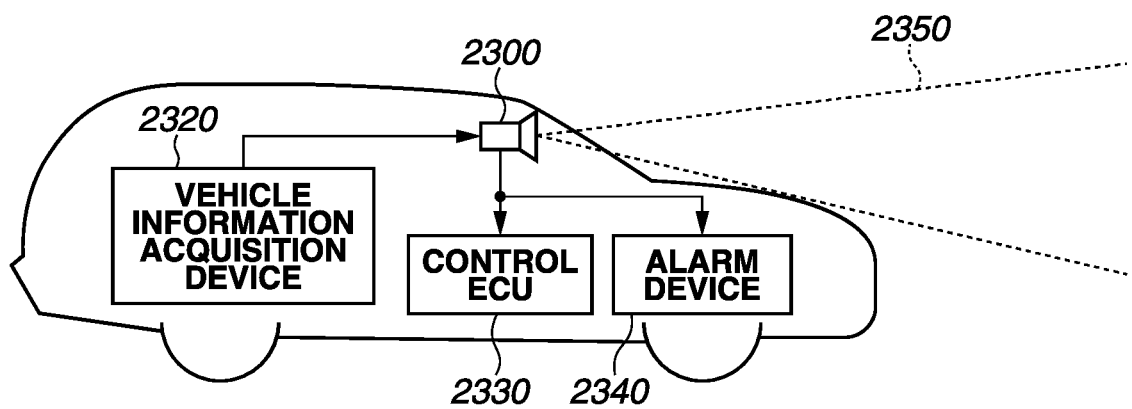

A photoelectric conversion system and a moving body according to a sixth exemplary embodiment will be described with reference to FIGS. 12A and 12B. FIG. 12A illustrates a configuration example of the photoelectric conversion system according to the sixth exemplary embodiment, and FIG. 12B illustrates a configuration example of the moving body according to the sixth exemplary embodiment.

FIG. 12A illustrates an example of a photoelectric conversion system relating to an on-vehicle camera. A photoelectric conversion system 2300 includes an image capturing device 2310. The image capturing device 2310 is any of the photoelectric conversion devices according to the above-described exemplary embodiments. The photoelectric conversion system 2300 includes an image processing unit or circuit 2312 that performs image processing on a plurality of pieces of image data acquired by the image capturing device 2310, and a parallax acquisition unit or circuit 2314 that calculates a parallax (phase difference between parallax images) based on the plurality of pieces of image data acquired by the photoelectric conversion system 2300. The photoelectric conversion system 2300 also includes a distance measurement unit or circuit 2316 that calculates a distance to a target object based on the calculated parallax, and a collision determination unit or circuit 2318 that determines whether there is a possibility of collision based on the calculated distance. The parallax acquisition circuit 2314 and the distance measurement circuit 2316 are examples of a distance information acquisition unit or circuit that acquires distance information indicating a distance to a target object. The distance information indicates information about a parallax, a defocus amount, a distance to a target object, and the like. The collision determination circuit 2318 may determine the possibility of collision using any one of the pieces of distance information. The distance information acquisition circuit may be implemented by an exclusively designed hardware or software module.

Alternatively, the distance information acquisition circuit may be implemented by a field-programmable gate array (FPGA), an application-specific integrated circuit (ASIC), or the like, or a combination thereof.

The photoelectric conversion system 2300 is connected to a vehicle information acquisition device 2320, and can acquire vehicle information such as a vehicle speed, a yaw rate, and a steering angle. The photoelectric conversion system 2300 is also connected to a control engine control unit or circuit (ECU) 2330 serving as a control unit or circuit that outputs a control signal for applying a braking force to a vehicle, based on a result of determination by the collision determination circuit 2318. The photoelectric conversion system 2300 is also connected to an alarm device 2340 that issues an alarm to a driver based on the result of determination by the collision determination circuit 2318. For example, in a case where there is a high possibility of collision based on the result of determination by the collision determination circuit 2318, the control ECU 2330 performs vehicle control to avoid a collision or reduce damage by, for example, applying brakes, releasing an accelerator, or restraining engine power. The alarm device 2340 warns a user by, for example, generating an alarm sound, displaying alarm information on a screen of a navigation system or the like, or applying vibrations to a seat belt or a steering wheel.

In the present exemplary embodiment, the photoelectric conversion system 2300 captures images of an area around the vehicle such as a front side or a rear side of the vehicle. FIG. 12B illustrates the photoelectric conversion system 2300 in a case where an image of the front side of the vehicle (an imaging range 2350) is captured. The vehicle information acquisition device 2320 sends an instruction to the photoelectric conversion system 2300 or the image capturing device 2310. This configuration can improve the accuracy of ranging.

While the example of control for avoiding a collision with another vehicle is described above, the present exemplary embodiment is also applicable to control for automated driving to follow another vehicle, control for automated driving not to stray from a traffic lane, and the like. The photoelectric conversion system 2300 is not only applicable to a vehicle such as an automobile but also applicable to a moving body (traveling apparatus), for example, a ship, an airplane, or an industrial robot. Furthermore, the photoelectric conversion system 2300 is applicable not only to the moving body, but also to an apparatus that widely uses object recognition, such as an intelligent transport system (ITS).

Figure 13:
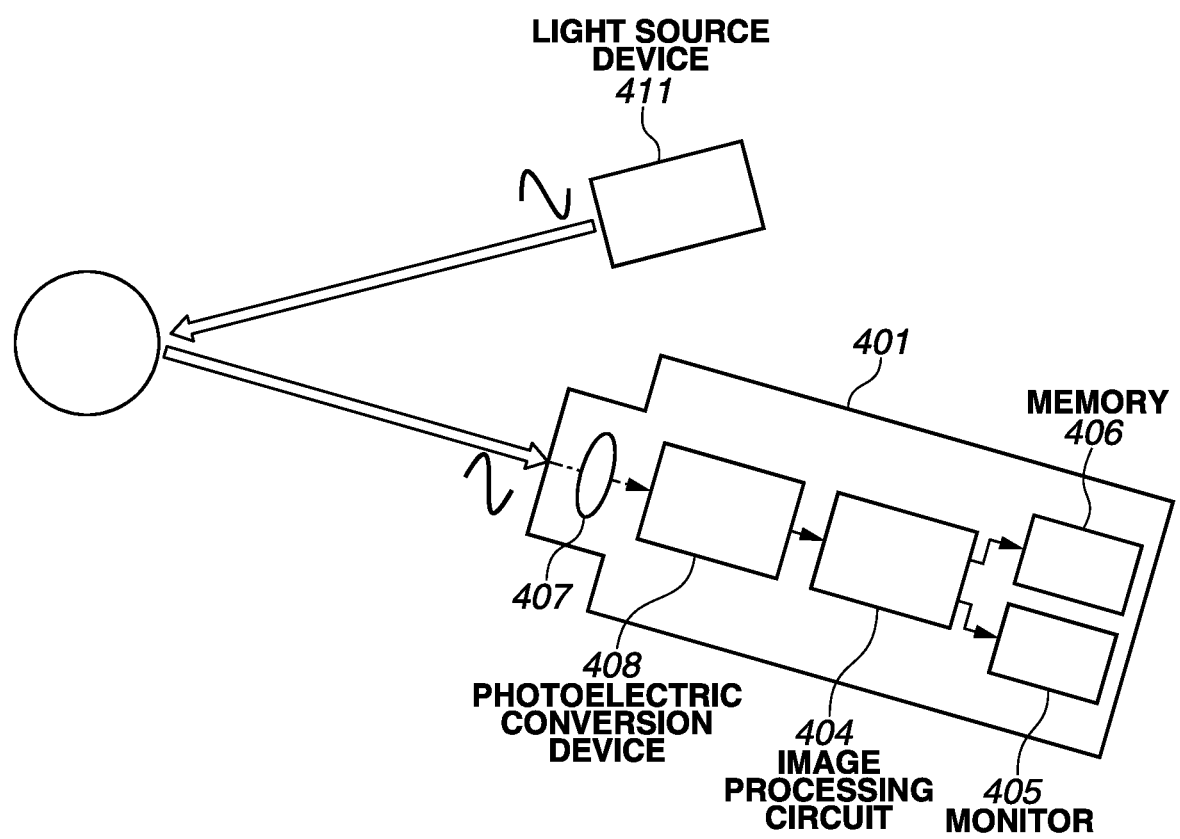
FIG. 13 is a functional block diagram of a photoelectric conversion system according to a seventh exemplary embodiment.

A photoelectric conversion system according to a seventh exemplary embodiment will be described with reference to FIG. 13. FIG. 13 is a block diagram illustrating a configuration example of a distance image sensor as the photoelectric conversion system according to the seventh exemplary embodiment.

As illustrated in FIG. 13, a distance image sensor 401 includes an optical system 407, a photoelectric conversion device 408, an image processing circuit 404, a monitor 405, and a memory 406. The distance image sensor 401 receives light (modulated light or pulse light) reflected on the surface of an object when a light source device 411 projects light toward the object, thereby obtaining a distance image corresponding to the distance to the object.

The optical system 407 includes one or more lenses. The optical system 407 guides image light (incident light) from the object to the photoelectric conversion device 408, and forms an image on a light-receiving surface (sensor portion) of the photoelectric conversion device 408.

As the photoelectric conversion device 408, the photoelectric conversion device according to any one of the above-described exemplary embodiments is applied, and a distance signal indicating the distance obtained based on the received light signal output from the photoelectric conversion device 408 is supplied to the image processing circuit 404.

The image processing circuit 404 performs image processing to construct the distance image based on the distance signal supplied from the photoelectric conversion device 408. The distance image (image data) obtained by the image processing is supplied to the monitor 405 and displayed on the monitor 405, or is supplied to and stored (recorded) in the memory 406.

The distance image sensor 401 having the configuration described above can acquire, for example, a more accurate distance image with an improvement in the characteristics of pixels by applying any of the above-described photoelectric conversion devices.

Figure 14:
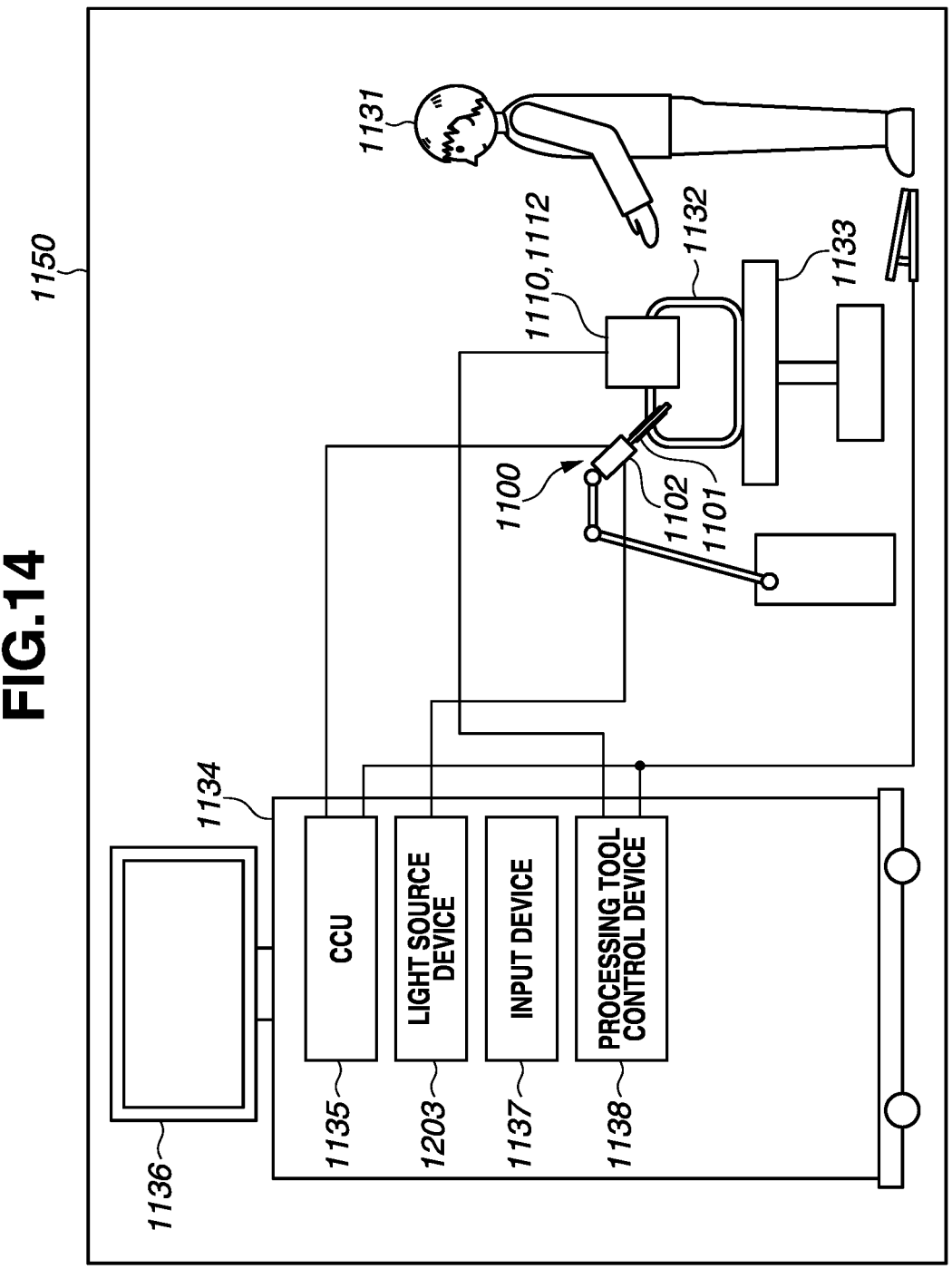
FIG. 14 is a functional block diagram of a photoelectric conversion system according to an eighth exemplary embodiment.

A photoelectric conversion system according to an eighth exemplary embodiment will be described with reference to FIG. 14. FIG. 14 schematically illustrates a configuration example of an endoscopic surgery system as the photoelectric conversion system according to the eighth exemplary embodiment.

FIG. 14 illustrates a state where an operator (doctor) 1131 performs a surgery on a patient 1132 on a patient bed 1133 using an endoscopic surgery system 1150. As illustrated in FIG. 14, the endoscopic surgery system 1150 includes an endoscope 1100, a surgical instrument 1110, and a cart 1134 on which various devices for microscopically controlled surgery are mounted.

The endoscope 1100 includes a lens barrel 1101 and a camera head 1102. A region of the endoscope 110 having a predetermined length from a distal end thereof is inserted into the body cavity of the patient 1132. The camera head 1102 is connected to a proximal end of the lens barrel 1101. In the illustrated example, the endoscope 1100 is configured as a so-called hard mirror including the hard lens barrel 1101. Alternatively, the endoscope 1100 may be configured as a so-called soft mirror including a soft lens barrel.

The distal end of the lens barrel 1101 is provided with an opening into which an objective lens is fit. A light source device 1203 is connected to the endoscope 1100. Light generated by the light source device 1203 is guided to the distal end of the lens barrel 1101 through a light guide extending in the lens barrel 1101, and the light is radiated toward an observation target in the body cavity of the patient 1132 through the objective lens. The endoscope 1100 may be a forward-viewing endoscope, a forward-oblique viewing endoscope, or a side-viewing endoscope.

An optical system and a photoelectric conversion device are provided in the camera head 1102, and reflected light (observation light) from the observation target is focused on the photoelectric conversion device by the optical system. The observation light is photoelectrically converted by the photoelectric conversion device, and an electric signal corresponding to the observation light, i.e., an image signal corresponding to the observation image, are generated thereby. As the photoelectric conversion device, any of the photoelectric conversion devices according to the above-described exemplary embodiments can be used. The image signal is transmitted as raw data to a camera control unit or circuit (CCU) 1135.

The CCU 1135 includes a central processing unit (CPU), a graphics processing unit (GPU), or the like, and controls operations of the endoscope 1100 and a display device 1136 in an integrated manner. Further, the CCU 1135 receives the image signal from the camera head 1102, and performs various image processing for displaying an image based on the image signal, such as development processing (demosaicing processing), on the image signal.

The display device 1136 displays the image based on the image signal on which image processing is performed by the CCU 1135 under control of the CCU 1135.

The light source device 1203 includes, for example, a light source such as a light-emitting diode (LED), and supplies irradiation light to the endoscope 1100 when an image of a surgical site or the like is captured.

An input device 1137 is an input OF with the endoscopic surgery system 1150. The user can input various information and instructions to the endoscopic surgery system 1150 through the input device 1137.

A processing tool control device 1138 controls driving of an energy treatment tool 1112 for cauterization or incision of a tissue, sealing of a blood vessel, or the like.

The light source device 1203 that supplies irradiation light to the endoscope 1100 when an image of a surgical site is captured can include, for example, a white light source composed of an LED, a laser light source, or a combination thereof. If the white light source is composed of a combination of red, green, and blue (RGB) laser light sources, an output intensity and an output timing of each color (each wavelength) can be accurately controlled. Thus, the light source device 1203 can adjust the white balance of the captured image. In this case, laser light from each of the RGB laser light sources is radiated to the observation target by time division, and driving of an image sensor of the camera head 1102 is controlled in synchronization with the irradiation timing, thereby making it possible to capture respective images corresponding to RGB laser light beams by time division. According to this method, a color image can be obtained without providing any color filter in the image sensor.

Driving of the light source device 1203 may be controlled such that the intensity of light to be output is changed at predetermined time intervals. Driving of the image sensor of the camera head 1102 is controlled in synchronization with the timing of changing the light intensity to obtain images by time division and combine the images, thereby making it possible to generate an image with a high dynamic range with no underexposure or overexposure.

The light source device 1203 may be configured to supply light in a predetermined wavelength band that enables special light observation to be performed. In the special light observation, for example, the wavelength dependence of absorption of light in a body tissue is used. Specifically, an image of a predetermined tissue, such as a blood vessel on a mucous surface, is captured with a high contrast by radiating light with a bandwidth narrower than that of irradiated light (i.e., white light) in a normal observation.

Alternatively, in the special light observation, fluorescent observation for obtaining an image using fluorescence generated by radiating excitation light may be performed. In the fluorescent observation, for example, excitation light is radiated to a body tissue, and fluorescence from the body tissue is observed, or a fluorescence image can be obtained by locally injecting reagent such as indocyanine green (ICG) into a body tissue and radiating excitation light corresponding to the fluorescence wavelength of the reagent to the body tissue. The light source device 1203 can be configured to supply narrow-band light and/or excitation light that enables the special light observation to be performed.

Figure 15A:
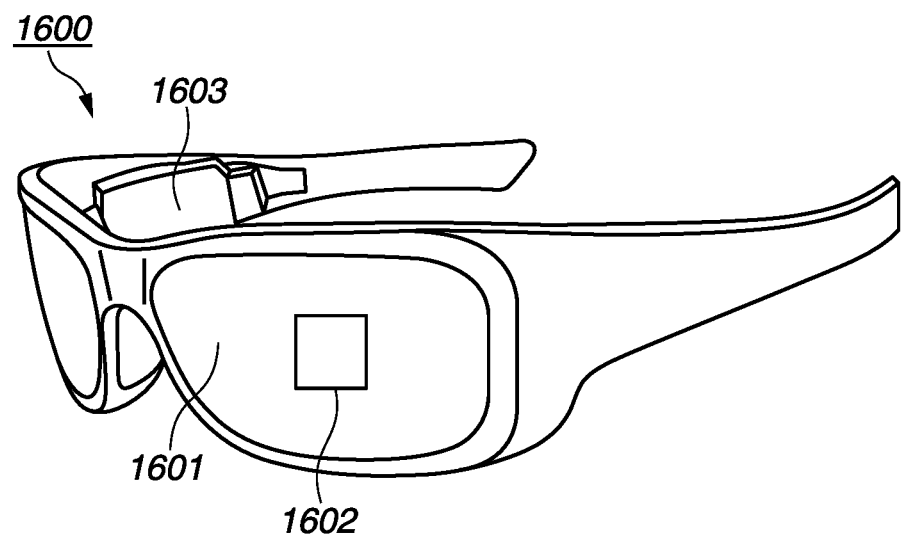
FIGS. 15A and 15B are functional block diagrams of a photoelectric conversion system according to a ninth exemplary embodiment.

A photoelectric conversion system according to a ninth exemplary embodiment will be described with reference to FIGS. 15A and 15B. FIG. 15A illustrates glasses 1600 (smart glasses) as the photoelectric conversion system according to the ninth exemplary embodiment. The glasses 1600 include a photoelectric conversion device 1602. The photoelectric conversion device 1602 is any one of the photoelectric conversion devices according to the above-described exemplary embodiments. A display device including a light-emitting device, such as an organic LED (OLED) or an LED, may be provided on the back surface of a lens 1601. One or more photoelectric conversion devices 1602 may be provided. A combination of various types of photoelectric conversion devices may be used. The layout position of the photoelectric conversion device 1602 is not limited to the layout position illustrated in FIG. 15A.

The glasses 1600 further include a control device 1603. The control device 1603 functions as a power supply that supplies power to the photoelectric conversion device 1602 and the above-described display device. The control device 1603 controls operations of the photoelectric conversion device 1602 and the display device. The lens 1601 is provided with an optical system to focus light on the photoelectric conversion device 1602.

Figure 15B:
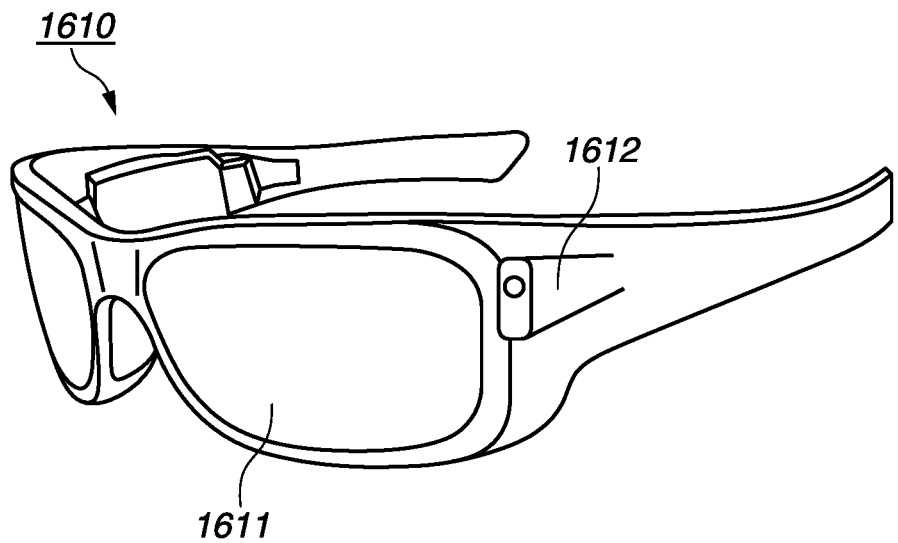

FIG. 15B illustrates glasses 1610 (smart glasses) according to an application example. The glasses 1610 include a control device 1612, and a photoelectric conversion device corresponding to the photoelectric conversion device 1602 and a display device are mounted on the control device 1612. A lens 1611 is provided with an optical system for projecting light emitted from the photoelectric conversion device and the display device in the control device 1612. An image is projected on the lens 1611. The control device 1612 functions as a power supply that supplies power to each of the photoelectric conversion device and the display device, and controls operations of the photoelectric conversion device and the display device. The control device 1612 may include a line-of-sight detection unit or circuit that detects the line of sight of a wearer. An infrared ray may be used to detect the line of sight. An infrared light-emitting unit or circuit emits infrared light to an eyeball of the user who is gazing at a displayed image. Reflected light of the emitted infrared light from the eyeball is detected by an image capturing unit or circuit including a light-receiving element, thereby obtaining a captured image of the eyeball. Provision of a reduction unit or circuit to reduce light from the infrared light-emitting circuit to the display circuit in a plan view makes it possible to reduce the deterioration in image quality.

The line of sight of the user on the display image is detected from the captured image of the eyeball obtained by capturing infrared light. Any known technique can be applied as a method of detecting the light of sight using a captured image of an eyeball. For example, a line-of-sight detection method using Purkinje images that are based on the reflections of irradiated light on corneas can be used.

More specifically, line-of-sight detection processing is performed based on pupil center corneal reflection. Using pupil center corneal reflection, a line-of-sight vector representing the direction (rotation angle) of the eyeball is calculated based on the image of the pupil and the Purkinje images included in the captured image of the eyeball, thereby detecting the line of sight of the user.

The display device according to the present exemplary embodiment may include a photoelectric conversion device including a light-receiving element, and may control a displayed image on the display device based on line-of-sight information about the user from the photoelectric conversion device.

Specifically, the display device determines a first field-of-view region at which the user gazes, and a second field-of-view region other than the first field-of-view region based on the line-of-sight information. The first field-of-view region and the second field-of-view region may be determined by a control device for the display device. Alternatively, the first field-of-view region and the second field-of-view region determined by an external control device may be received. In a display region of the display device, the display resolution of the first field-of-view region may be controlled to be higher than the display resolution of the second field-of-view region. In other words, the resolution of the second field-of-view region may be set to be lower than the resolution of the first field-of-view region.

The display region includes a first display region and a second display region different from the first display region. One of the first display region and the second display region with a higher priority may be determined based on the line-of-sight information. The first field-of-view region and the second field-of-view region may be determined by the control device for the display device. Alternatively, the first field-of-view region and the second field-of-view region determined by an external control device may be received. The resolution of the higher-priority region may be controlled to be higher than the resolution of the region other than the higher-priority region. In other words, the resolution of the region with a relatively low priority may be lowered.

An artificial intelligence (AI) may be used to determine the first field-of-view region and the higher-priority region. The AI may be a model configured to estimate a line-of-sight angle from an eyeball image and a distance to a target object on the line of sight using the eyeball image and the actual direction of the eyeball in the image as training data. An AI program may be included in the display device, may be included in the photoelectric conversion device, or may be included in an external device. If the AI program is included in the external device, the AI program is transmitted to the display device via communication.

In a case where display control is performed based on visual detection, smart glasses further including a photoelectric conversion device that captures an image outside the system can be suitably applied. The smart glasses are configured to display captured external information in real time.

Modified Exemplary Embodiments

The disclosure is not limited to the above-described exemplary embodiments, and can be modified in various ways.

For example, an example where a part of the configuration according to any of the exemplary embodiments is added to any of the other exemplary embodiments, and an example where a part of the configuration according to any of the exemplary embodiments is replaced with a part of the configuration according to any of the other exemplary embodiments are also included in the exemplary embodiments of the disclosure.

The photoelectric conversion systems according to the fifth and sixth exemplary embodiments described above are examples of the photoelectric conversion system to which the photoelectric conversion device according to any one of the exemplary embodiments can be applied. The photoelectric conversion system to which the photoelectric conversion device according to any one of the exemplary embodiments can be applied is not limited to the configurations illustrated in FIGS. 11 to 12B. The same applies to the ToF system according to the seventh exemplary embodiment, the endoscope according to the eighth exemplary embodiment, and the smart glasses according to the ninth exemplary embodiment.

The above-described exemplary embodiments are merely examples for embodying the disclosure. The technical scope of the disclosure should not be interpreted in a limited way by the exemplary embodiments. That is, the disclosure can be carried out in various forms without departing from the technical idea or the main features thereof.

According to an aspect of the disclosure, it is possible to reduce power consumption in a case where pixel signals are added or averaged.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-104635, filed Jun. 29, 2022, which is hereby incorporated by reference herein in its entirety.

What is claimed is:

1. A photoelectric conversion device comprising:
a first substrate on which a plurality of photoelectric conversion circuits is disposed;
a plurality of floating diffusion circuits connected to the plurality of photoelectric conversion circuits;
a first switch configured to connect a first floating diffusion circuit and a second floating diffusion circuit in the plurality of floating diffusion circuits;
a second switch configured to connect the second floating diffusion circuit and a third floating diffusion circuit in the plurality of floating diffusion circuits;
a line configured to connect the first floating diffusion circuit and the second floating diffusion circuit and the third floating diffusion circuit;
a second substrate on which a plurality of amplification transistors configured to output signals based on potentials of the plurality of floating diffusion circuits are disposed;

a first signal line connected to a first amplification transistor in the plurality of amplification transistors;

a first signal readout circuit connected to the first signal line;

a second signal line connected to a second amplification transistor in the plurality of amplification transistors; and a second signal readout circuit connected to the second signal line, wherein the line includes a first node configured to connect the first floating diffusion circuit and the line, a second node configured to connect the second floating diffusion circuit and the line, and a third node configured to connect the third floating diffusion circuit and the line, wherein the first switch includes a first terminal connected to the first node and a second terminal connected to the second node, wherein the second switch includes a third terminal connected to the second node and a fourth terminal connected to the third node, wherein the second terminal is connected to the third terminal via the second node, wherein in a case where the first switch is in an off state, the first signal readout circuit and the second signal readout circuit are in an operating state, and wherein in a case where the first switch is in an on state, the first signal readout circuit is in a non-operating state.

2. The photoelectric conversion device according to claim 1,
wherein the first signal readout circuit includes a first current source transistor connected to a current source, and
wherein in a case where the first switch is in the on state, the first current source transistor is in an off state.

3. The photoelectric conversion device according to claim 1,
wherein the second signal readout circuit includes a second current source transistor connected to a current source, and
wherein in a case where the first switch is in the on state, the second current source transistor is in an on state.

4. The photoelectric conversion device according to claim 1,
wherein the first signal readout circuit includes a first amplification circuit, and
wherein in a case where the first switch is in the on state, the first amplification circuit is in a non-operating state.

5. The photoelectric conversion device according to claim 1,
wherein the second signal readout circuit includes a second amplification circuit, and
wherein in a case where the first switch is in the on state, the second amplification circuit is in an operating state.

6. The photoelectric conversion device according to claim 1,
wherein the photoelectric conversion device further comprises:
a third signal line connected to a third amplification transistor in the plurality of amplification transistors; and
a third signal readout circuit connected to the third signal line, and
wherein in reading out signals in one row by vertical scanning, in a case where the second switch is in an off state, the second signal readout circuit and the third signal readout circuit are in an operating state, and in a case where the second switch is in an on state, the third signal readout circuit is in a non-operating state.

7. The photoelectric conversion device according to claim 6,
wherein the third signal readout circuit includes a third current source transistor connected to a current source, and
wherein in a case where the second switch is in the on state, the third current source transistor is in a non-conductive state.

8. The photoelectric conversion device according to claim 6,
wherein the third signal readout circuit includes a third amplification circuit, and
wherein in a state where the second switch is in the on state, the third amplification circuit is in a non-operating state.

9. The photoelectric conversion device according to claim 6, wherein the photoelectric conversion circuit connected to the first floating diffusion circuit and the photoelectric conversion circuit connected to the second floating diffusion circuit include color filters of the same color.

10. The photoelectric conversion device according to claim 9, wherein the photoelectric conversion circuit connected to the first floating diffusion circuit and the photoelectric conversion circuit connected to the third floating diffusion circuit include color filters of the same color.

11. The photoelectric conversion device according to claim 1,
wherein the plurality of photoelectric conversion circuits is disposed in an array, and
wherein a plurality of color filters disposed on a light incidence surface side of the plurality of photoelectric conversion circuits forms a Bayer array.

12. The photoelectric conversion device according to claim 1, further comprising:
a fourth floating diffusion circuit connected to the first signal line; and
a third switch configured to connect the first floating diffusion circuit and the fourth floating diffusion circuit.

13. The photoelectric conversion device according to claim 12, wherein the first switch is disposed on the first substrate.

14. The photoelectric conversion device according to claim 13, wherein the third switch is disposed on the second substrate.

15. The photoelectric conversion device according to claim 1,
wherein the first substrate includes a first surface and a second surface opposed to the first surface,
wherein the second substrate includes a third surface opposed to the second surface, and a fourth surface opposed to the third surface,
wherein the plurality of amplification transistors is disposed on the fourth surface, and
wherein the photoelectric conversion device further comprises a third substrate stacked on the fourth surface of the second substrate.

16. A photoelectric conversion system comprising:
the photoelectric conversion device according to claim 1; and
a signal processing circuit configured to generate an image using a signal output from the photoelectric conversion device.

17. A moving body comprising:
the photoelectric conversion device according to claim 1; and
a control circuit configured to control traveling of the moving body using a signal output from the photoelectric conversion device.

18. The photoelectric conversion device according to claim 1, wherein in a case where the first switch is in the on state, the first node is connected to the second node without going through the third terminal and the fourth terminal.

19. The photoelectric conversion device according to claim 1, wherein in a case where the first switch and the second switch are in the on state, the first node is connected to the third node via the third terminal and the fourth terminal.

20. A photoelectric conversion device comprising:
a first substrate on which a plurality of photoelectric conversion circuits is disposed; and
a second substrate on which a plurality of floating diffusion circuits connected to the plurality of photoelectric conversion circuits, a first switch configured to connect a first floating diffusion circuit and a second floating diffusion circuit in the plurality of floating diffusion circuits, a second switch configured to connect the second floating diffusion circuit and a third floating diffusion circuit in the plurality of floating diffusion circuits, a line configured to connect the first floating diffusion circuit and the second floating diffusion circuit and the third floating diffusion circuit and a plurality of amplification transistors configured to output signals based on potentials of the plurality of floating diffusion circuits are disposed,
wherein the line includes a first node configured to connect the first floating diffusion circuit and the line, a second node configured to connect the second floating diffusion circuit and the line, and a third node configured to connect the third floating diffusion circuit and the line,
wherein the first switch includes a first terminal connected to the first node and a second terminal connected to the second node,
wherein the second switch includes a third terminal connected to the second node and a fourth terminal connected to the third node, and
wherein the second terminal is connected to the third terminal via the second node.

21. The photoelectric conversion device according to claim 20, further comprising:
a first signal line connected to a first amplification transistor in the plurality of amplification transistors;
a first signal readout circuit connected to the first signal line;
a second signal line connected to a second amplification transistor in the plurality of amplification transistors; and
a second signal readout circuit connected to the second signal line.

22. The photoelectric conversion device according to claim 21,
wherein the first substrate includes a first surface and a second surface opposed to the first surface,
wherein the second substrate includes a third surface opposed to the second surface, and a fourth surface opposed to the third surface,
wherein the plurality of amplification transistors is disposed on the fourth surface, and
wherein the photoelectric conversion device further comprises a third substrate stacked on the fourth surface of the second substrate.

23. The photoelectric conversion device according to claim 22, wherein the first signal readout circuit and the second signal readout circuit are disposed on the third substrate.

24. The photoelectric conversion device according to claim 17,
wherein in a case where the first switch is in an off state, the first signal readout circuit and the second signal readout circuit are in an operating state, and
wherein in a case where the first switch is in an on state, the first signal readout circuit is in a non-operating state.

25. The photoelectric conversion device according to claim 20, wherein in a case where the first switch is in an on state, the first node is connected to the second node without going through the third terminal and the fourth terminal.

26. The photoelectric conversion device according to claim 20, wherein in a case where the first switch and the second switch are in an on state, the first node is connected to the third node via the third terminal and the fourth terminal.

* * * * *